United States Patent
Klausner et al.

(10) Patent No.: US 12,037,557 B2
(45) Date of Patent: Jul. 16, 2024

(54) SOLID THERMOCHEMICAL FUEL APPARATUS

(71) Applicant: Board of Trustees of Michigan State University, East Lansing, MI (US)

(72) Inventors: James F. Klausner, Haslett, MI (US); Joerg Petrasch, East Lansing, MI (US); Kelvin Randhir, East Lansing, MI (US); Nima Rahmatian, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 18/107,535

(22) Filed: Feb. 9, 2023

(65) Prior Publication Data

US 2023/0183590 A1    Jun. 15, 2023

Related U.S. Application Data

(63) Continuation of application No. PCT/US2021/044651, filed on Aug. 5, 2021.
(Continued)

(51) Int. Cl.
| *C10L 9/06* | (2006.01) |
| *C10L 5/28* | (2006.01) |
| *C10L 9/08* | (2006.01) |

(52) U.S. Cl.
CPC .................. *C10L 5/28* (2013.01); *C10L 9/06* (2013.01); *C10L 9/08* (2013.01);
(Continued)

(58) Field of Classification Search
CPC .............................................. C10L 2200/0213
See application file for complete search history.

(56) References Cited

U.S. PATENT DOCUMENTS

| 2002/0195164 A1 | 12/2002 | Zahrah et al. |
| 2008/0175766 A1 | 7/2008 | Mankins et al. |
(Continued)

FOREIGN PATENT DOCUMENTS

| CN | 208485776 U | 2/2019 |
| JP | 3301459 B2 | 7/1995 |
(Continued)

OTHER PUBLICATIONS

Ho, C.K., "Highlights of the High-Temperature Falling Particle Receiver Project: 2012-2016," AIP Conference Proceedings 1850, 030027 (2017).
(Continued)

*Primary Examiner* — Ellen M McAvoy
*Assistant Examiner* — Ming Cheung Po
(74) *Attorney, Agent, or Firm* — Harness, Dickey & Pierce, PLC

(57) ABSTRACT

A method of charging and/or discharging energy in reusable fuel workpieces or particles includes a solar furnace with counter-flowing workpieces and gas, to exchange heat therebetween, with the exiting gas and workpieces being at about ambient temperature. A further aspect employs a production plant including a reduction reactor configured to use excess electrical energy generated by renewable power generators to charge and/or discharge solid-state thermochemical fuel. Another aspect includes a fuel flow control valve using air pulses. An oxygen-deprived and reusable fuel, such as magnesium manganese oxide, or magnesium iron oxide, is also provided. In another aspect, an apparatus for producing a solid-state fuel includes a reduction reactor including a reactor chamber configured to receive concentrated solar energy, and a reactor tube having a recuperation zone, a reduction zone, and a quenching zone, wherein the reduction zone passes through the reactor chamber. A dis-
(Continued)

charged solid-state fuel is configured to be fed down the reactor tube and a low-oxygen gas is configured to flow up the reactor tube.

17 Claims, 16 Drawing Sheets

Related U.S. Application Data

(60) Provisional application No. 63/144,120, filed on Feb. 1, 2021, provisional application No. 63/064,256, filed on Aug. 11, 2020.

(52) U.S. Cl.
CPC .............. *C10L 2200/0213* (2013.01); *C10L 2200/0236* (2013.01); *C10L 2200/0254* (2013.01); *C10L 2290/06* (2013.01)

(56) References Cited

U.S. PATENT DOCUMENTS

| | | |
|---|---|---|
| 2009/0274985 A1 | 11/2009 | McKnight et al. |
| 2010/0000874 A1 | 1/2010 | Hinman et al. |
| 2010/0247387 A1* | 9/2010 | Perkins ..................... C10L 1/04 422/652 |
| 2010/0303692 A1 | 12/2010 | Perkins et al. |
| 2015/0177030 A1 | 6/2015 | Vilim et al. |
| 2015/0362184 A1 | 12/2015 | Tait et al. |
| 2017/0217771 A1 | 8/2017 | Klausner et al. |
| 2017/0304794 A1* | 10/2017 | Klausner ................ B01J 8/0278 |
| 2021/0395624 A1 | 12/2021 | Scheffe et al. |

FOREIGN PATENT DOCUMENTS

| | | | |
|---|---|---|---|
| WO | WO-0056658 A1 * | 9/2000 | ............... C01B 3/38 |
| WO | WO-2020/101890 A1 | 5/2020 | |
| WO | WO-2020/146361 A1 | 7/2020 | |

OTHER PUBLICATIONS

Randhir, K., et al., "Oxidation Kinetics of Magnesium-Manganese Oxides for High-Temperature Thermochemical Energy Storage," Advanced Science News, Energy Technology (2020).
Randhir, K., et al., "Magnesium-manganese oxides for high temperature thermochemical energy storage," Journal of Energy Storage, vol. 21, pp. 599-610 (2019).
Randhir, K., et al., "Magnesioferrites for solar thermochemical fuel production," Solar Energy, vol. 163, pp. 1-15 (2018).
King, K., et al., "Enhancing thermochemical energy storage density of magnesium-manganese oxides," Energy Storage (Jul. 13, 2019).
King, K., et al., "Calorimetric method for determining the thermochemical energy storage capacities of redox metal oxides," Thermochimica Acta, vol. 673, pp. 105-118 (2019).
Jackson, G. S., et al., "Inert and Reactive Oxide Particles for High-Temperature Thermal Energy Capture and Storage for Concentrating Solar Power," Journal of Solar Energy Engineering, vol. 141 (Apr. 2019).
Garrity, P., "Performance of Aluminum and Carbon Foams for Air Side Heat Transfer Augmentation," Journal of Heat Transfer, vol. 132 (Dec. 2010).
Akolkar, A., "Tomography based pore-level optimization of radiative transfer in porous media," International Journal of Heat and Mass Transfer, vol. 54, pp. 4775-4783 (2011).
Petrasch, J., "Tomography based determination of permeability, Dupit-Forchheimer coefficient, and interfacial heat transfer coefficient in reticulate porous ceramics," Science Direct, International Journal of Heat and Fluid Flow, vol. 29, pp. 315-326 (2008).
Vozar, L., "A Computer-Controlled Apparatus for Thermal Conductivity Measurement by the Transient Hot Wire Method," Journal of Thermal Analysis, vol. 46, p. 495-505 (1996).
Marxer, D., et al., "Solar Thermochemical Splitting of CO2 into Separate Streams of CO and O2 with High Selectivity, Stability, Conversion, and Efficiency," Energy & Environmental Science, vol. 10, pp. 1015-1286 (May 2017).
Muhich, C. L., "A review and perspective of efficient hydrogen generation via solar thermal water splitting," WIREs Energy Environ, vol. 5, pp. 261-287 (May/Jun. 2016).
Li, L., et al., "A transient heat transfer model for high temperature solar thermochemical reactors," Int'l Journal of Hydrogen Energy, vol. 41, pp. 2307-2325 (2016).
Li, L., "Multiple-time-scaling lattice Boltzmann method for the convection diffusion equation," Physical Review, Department of Mechanical Engineering, Mississippi State University (Jun. 3, 2019).
Li, L., "Lattice Boltzmann models for the convection-diffusion equation: D2Q5 vs D2Q9," Int'l Journal of Heat and Mass Transfer, vol. 108, pp. 41-62 (2017).
Li, L., et al., "Conjugate heat and mass transfer in the lattice Boltzmann equation method," Physical Review E, vol. 89, p. 043308 (2014).
Miller, D. C., "Heat transfer in counterflow fluidized bed of oxide particles for thermal energy storage," Int'l Journal of Heat and Mass Transfer, vol. 126, pp. 730-745 (2018).
Jung, I., et al., "Critical thermodynamic evaluation and optimization of the Fe—Mg—O system," Journal of Physics and Chemistry of Solids, vol. 65, pp. 1683-1695 (2004).
Nakamura, T., "Hydrogen Production from Water Utilizing Solar Heat at High Temperatures," Solar Energy, vol. 19, pp. 467-475 (1977).
Babiniec, S. M., "Considerations for the Design of a High-Temperature Particle Reoxidation Reactor for Extraction of Heat in Thermochemical Energy Storage Systems," ASME (Jun. 26-30, 2016).
Tescari, S., "Thermochemical solar energy storage via redox oxides: materials and reactor/heat exchanger concepts," Energy Procedia, vol. 49, pp. 1034-1043 (2014).
Miller, J. E., "High Performance Reduction/Oxidation Metal Oxides for Thermochemical Energy Storage (Promotes)," ASME (Jun. 26-30, 2016).
Wu, S., et al., "A review on high-temperature thermochemical energy storage based on metal oxides redox cycle," Energy Conversion and Management, vol. 168, pp. 421-453 (2018).
Rao, et al., "Supporting Information," PNAS (Dec. 19, 2017).
Muhich, C. L., "Comparing the solar-to-fuel energy conversion efficiency of ceria and perovskite based thermochemical redox cycles for splitting H20 and CO2," Int'l Journal of Hydrogen Energy, vol. 43, pp. 18814-18831 (2018).
Murmura, M. A., et al., "Methodologies for the Design of Solar Receiver/Reactors for Thermochemical Hydrogen Production," Processes (2020).
Rao, C. N. R., et al., "Solar thermochemical splitting of water to generate hydrogen," PNAS, vol. 114 (Dec. 19, 2017).
Wokon, M., et al., "Investigations on thermochemical energy storage based on technical grade manganese-iron oxide in a lab-scale packed bed reactor," Solar Energy, vol. 153, pp. 200-214 (2017).
International Search Report and Written Opinion, International Application PCT/US21/44651 (Jan. 18, 2022).
Australian Office Action in Application No. 2021325660 dated Mar. 22, 2023.
Indian Office Action in Application No. 202347010918 dated Sep. 8, 2023.
EPO Extended Search Report (Oct. 24, 2023).
Welte. M., et al., "Combined Ceria Reduction and Methane Reforming in a Solar-Driven Particle-Transport Reactor," Industrial & Engineering Chemistry Research, vol. 56, No. 37, pp. 10300-10308 (Sep. 20, 2017).

\* cited by examiner

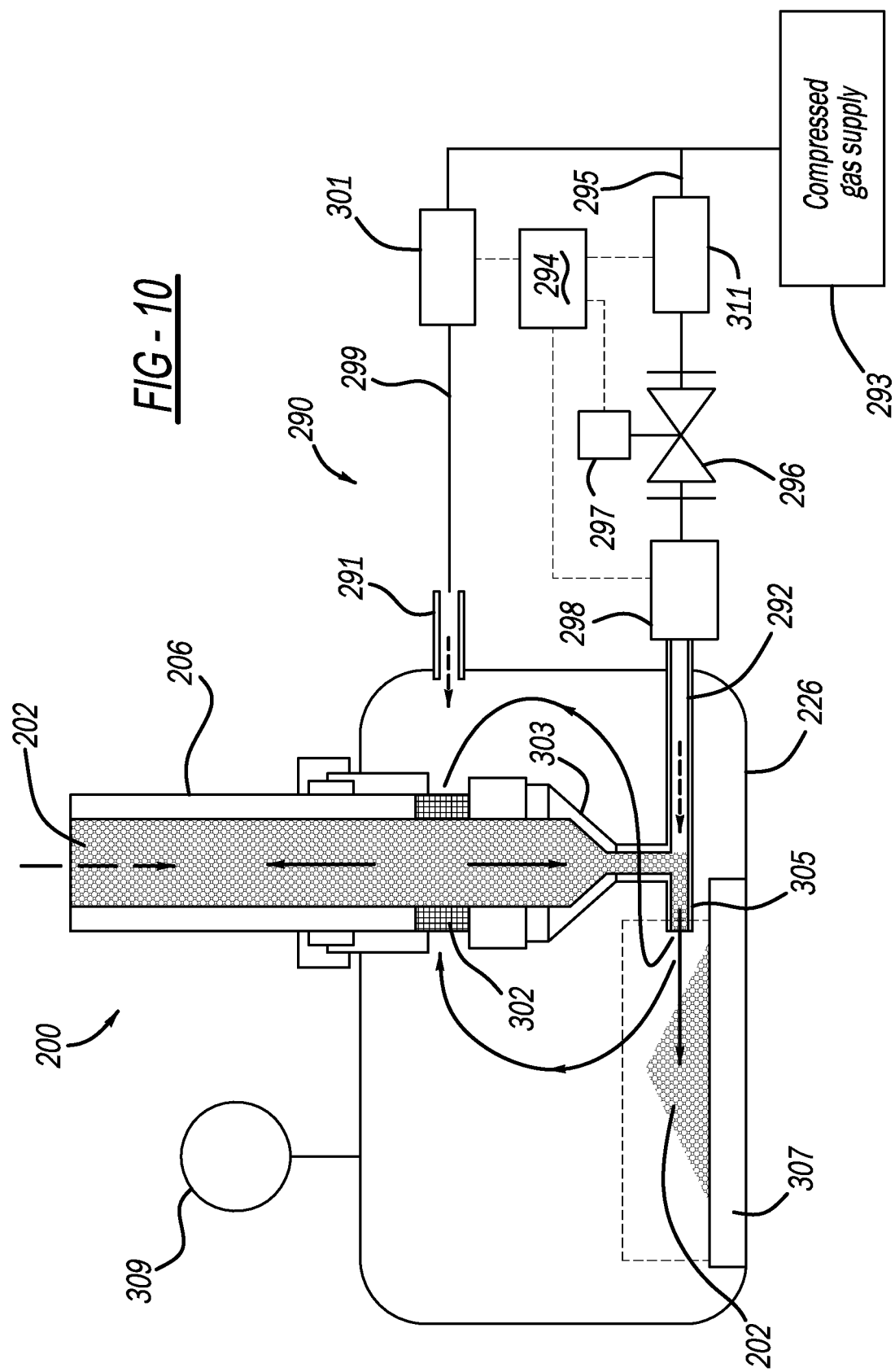

SOLID THERMOCHEMICAL FUEL APPARATUS

CROSS-REFERENCE TO RELATED APPLICATIONS

The present application is a continuation of PCT patent application serial no. PCT/US2021/044651 filed on Aug. 5, 2021, which claims priority to U.S. provisional patent application Ser. No. 63/144,120 filed on Feb. 1, 2021, and U.S. provisional patent application No. 63/064,256 filed on Aug. 11, 2020, all of which are incorporated by reference herein.

BACKGROUND AND SUMMARY

The present disclosure generally pertains to a solid-state thermochemical fuel and an apparatus for creating same.

Long-duration thermal storage is a significant challenge due to thermal losses inherent to all high temperature systems. A viable route to long-term storage is to use thermochemical reactions to convert concentrated solar energy to a fuel that can be stored at room temperature. Substantial prior efforts have considered solar thermochemistry to split water and $CO_2$ to produce synthetic gas. While significant progress has been made, the downside is that the solar to fuel conversion efficiency for water and $CO_2$ splitting remains low (<10%). Additionally, prior high temperature energy technologies ultimately fell short of performance goals due to material stability and compatibility problems at high operating temperatures.

A publication by Wokon et al., "Investigations on Thermochemical Energy Storage Based on Technical Grade Manganese-Iron Oxide in a Lab-Scale Packed Bed Reactor," Solar Energy 153 (2017) 200-214, discusses an experiment using a packed or fixed bed of granular manganese-iron oxide in a concentrated solar power furnace. A reversible reduction-oxidation ("redox") reaction is used to store thermal energy in the material, but the Wokon device is limited in its peak furnace temperature due to the reactor tube materials disclosed among other reasons. The manganese-iron oxide used therein is also not well suited for optimum charging and energy storage capacity. This system suffers from high temperatures for the exiting gas which requires an extra water cooler, thereby wasting energy and increasing complexity. Additionally, the Wokon system operates in a batch mode rather than in a steady state condition, which is energy inefficient and cannot handle commercially practical throughput. Furthermore, Wokon's material exhibits undesirable redox stratification due to the fixed and stationary bed positioning thereof.

In accordance with the present invention, a solid-state thermochemical fuel is provided. In another aspect, a production plant may include a reduction reactor configured to capture concentrated solar radiation to charge the solid-state thermochemical fuel. A further aspect employs a production plant including a reduction reactor configured to use excess electrical energy generated by renewable power generators, such as wind turbines, water turbines, photovoltaic solar panels, geothermal or the like, to charge and/or discharge solid-state thermochemical fuel. The solid-state thermochemical fuel, production plant, and process described are advantageous over other conventional fuels, systems, and processes. Instead of using reactive metal oxides to split water and $CO_2$, which is inefficient and may be years away from commercialization, the reactive metal oxide itself is used as a solid-state fuel, and thermodynamic modeling indicates that the solar to fuel conversion efficiency can be as high as 54% with an energy storage cost <$5 $kWh^{-1}_{thermal}$. The present solid-state fuel decouples the solar field and optics from the power block. This novel alternative to traditional concentrated storage power ("CSP") thermal energy storage will extend the reach and relevance of CSP beyond the restricted footprint of the CSP plant, and can provide a significant boost to the CSP and renewable energy storage industry. Additional advantages of the present solid-state fuel, production plant, and process include: (1) a low-cost zero-emission fuel for short- or long-duration storage; (2) a solid-state fuel that can be stored within a low cost bin at ambient temperature until it is used; (3) reasonable cost long duration solar energy storage; and (4) decoupling the power block from the solar field.

Further in accordance with the present invention, a method of charging and/or discharging energy in reusable fuel workpieces or particles includes a solar furnace with counterflowing workpieces and gas, to exchange heat therebetween, with the exiting gas and workpieces being at about ambient temperature. Another aspect of the present apparatus includes a fuel flow control valve using air pulses. An additional aspect of the present method and apparatus includes splitting hydrogen from steam in an oxidation reactor obtaining heat energy from oxygen-depleted solid fuel. An oxygen-deprived and reusable fuel, such as magnesium manganese oxide, or magnesium iron oxide is also provided in a further aspect of the present apparatus.

The present method, apparatus and fuel is advantageous over conventional systems. For example, the present fuel can be advantageously stored at about room temperature, for many months and optionally in the open air, without substantial loss of its energy storage potential. This makes it well suited for long distance transportation in low cost shipping containers and vehicles such as in air-accessible dump trucks, rail cars, ships and the like. The present fuel is also created and energy is extracted therefrom in a generally zero-carbon and very efficient manner.

Moreover, the room temperature nature of the exiting workpieces and gas of the present apparatus allows for more efficient energy use, easier handling of the exiting materials and reduced cost processing equipment. Another benefit is the ability to charge and discharge the fuel, counterflowing with a heat exchanging gas, in the same or similar apparatus, which includes a pre-heating or recuperating zone, a reduction or energy extraction middle zone, and a quenching or cooling zone. The present pulsating air valve is advantageous over mechanical valves since the air valve is more durable, more easily and quickly controlled and adjusted in an automated closed loop manner, and it does not create valve-to-workpiece friction thereby deterring workpiece attrition or undesired workpiece characteristic changes. Additional advantages and features of the present system, methods, and apparatuses, will become apparent from the following description and claims as well as the appended drawings.

BRIEF DESCRIPTION OF THE DRAWINGS

FIG. 10 is a diagrammatic view showing an optional solid fuel flow control system for any of the present reduction reactors;

DETAILED DESCRIPTION

Figure 1:
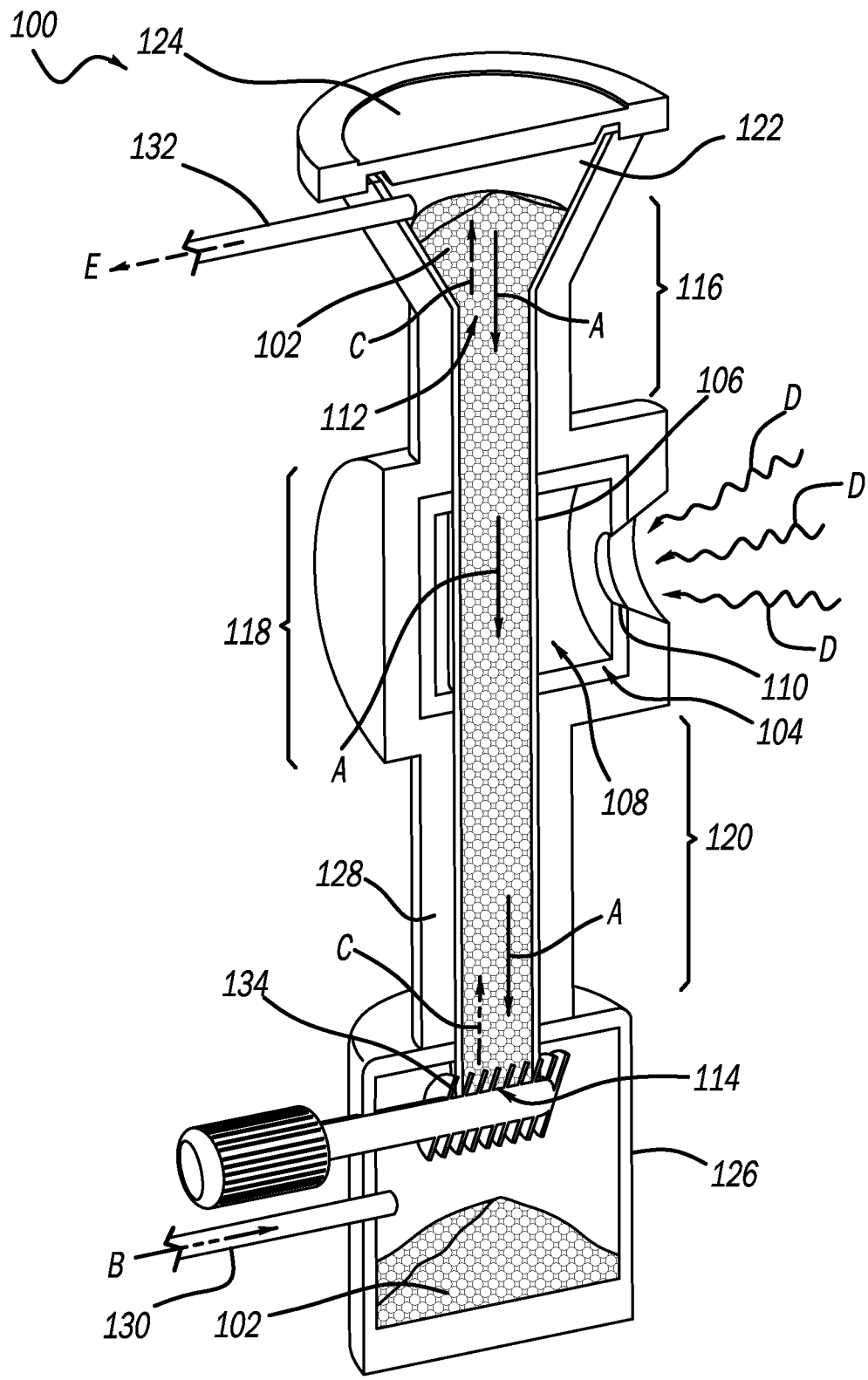
FIG. 1 is a cross-sectional view of a plant used to charge a solid-state fuel of the present invention.
Figure 2:
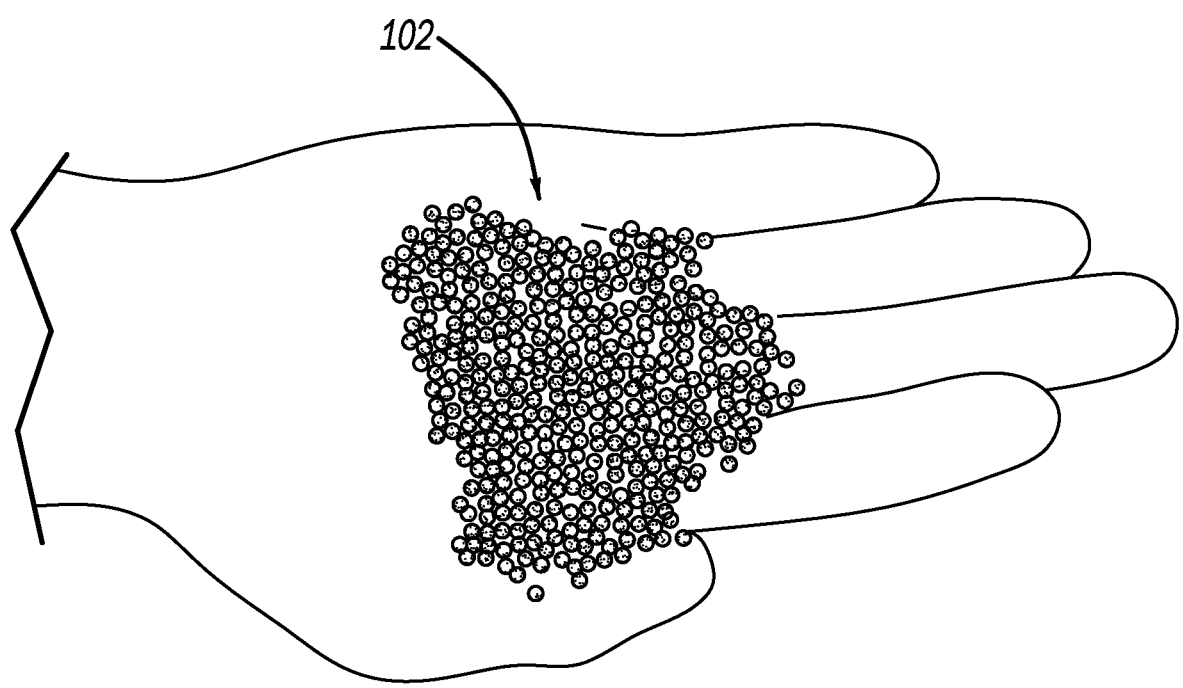
FIG. 2 is an illustration of the present solid-state fuel in an approximately spherical pellet form.

An embodiment of a production plant 100 and a high energy density, concentrated solar thermochemical storage solution in the form of a zero-emission solid-state fuel 102 produced by the plant 100 are shown in FIGS. 1 and 2. The solid-state fuel (solar fuel or SoFuel) 102 provides carbon-free fuel that can be stored for long durations and can be produced at a distance from a power block (e.g., power station). The nature of the solid-state fuel 102 is that it is a solid in its normal usage form. The solid-state fuel 102 can supply heat at 1000° C., for example, to a power block for electricity generation. The solid-state fuel 102 is preferably highly reactive magnesium manganese oxide (Mg—Mn—O) with a molar ratio of magnesium to manganese of 1:1. In some embodiments, the solid-state fuel 102 may be the reactive material described in International Patent Application Publication No. WO 2020/146361 entitled "System and Operation for Thermochemical Renewable Energy Storage" published to the Board of Trustees of Michigan State University on Jul. 16, 2020, and is incorporated by reference herein. The solid-state fuel 102 has potentially transformative value because of its inherent scalability to accommodate 1-100 MW production.

As shown in FIG. 2, the solid-state fuel 102 may be produced in a particle or pelletized form. In some embodiments, the solid-state fuel pellets 102 may range in size from about 600 μm to about 5000 μm. In some embodiments, the solid-state fuel pellets 102 are approximately spherical in shape with a 3000 μm (3 mm) diameter. In some embodiments, the solid-state fuel pellets 102 may be cylinders having a diameter in a range of about 2.5 mm to about 3.5 mm and a length in a range of about 1.5 mm to about 2.1 mm.

With reference again to FIG. 1, the production of the solid-state fuel 102 occurs within a cylindrical cavity chemical reactor that captures concentrated solar radiation from a solar field. The highly reactive magnesium manganese oxide (Mg—Mn—O) solid-state fuel 102 flows through a cylindrical cavity chemical reactor and undergoes thermal reduction as the temperature exceeds 1350° C. The thermally reduced Mg—Mn—O porous pellets or particles comprising the solid-state fuel 102 are cooled down and can be stored within a low-cost storage bin until used by the power block. The solid-state fuel 102 can be oxidized at a power block, where the solid-state fuel 102 supplies 1000° C. heat to the power block working fluid. The solid-state fuel 102 is then returned to the concentrating solar field where it is regenerated in the plant 100 for re-use. The sensible heat lost from cooling down the solid-state fuel 102 is recuperated using counter-flow gas in the falling-particle reactor configuration of the plant 100.

The solid-state fuel production plant 100 includes a reduction reactor 104 and a reactor tube 106. The reduction reactor 104 includes a reactor chamber 108 and an aperture 110 through which concentrated solar energy is configured to pass into the reactor chamber 108. The reduction reactor 104 captures concentrated solar radiation from a solar field through the aperture 110. The captured solar radiation is absorbed within reactor chamber 108 causing the reactor chamber 108 to heat up. The reduction reactor 104 acts as a solar furnace. The aperture 110 is sized to allow sufficient solar power flux into the reactor chamber 108, but the size of the reactor chamber 108 relative to the size of the aperture 110 may be large enough to prevent significant re-radiation out of the reactor chamber 108 through the aperture 110. In some embodiments, the aperture 110 may be equipped with a secondary concentrator to increase the efficiency of the reactor chamber 108. In some embodiments, the walls of the reduction reactor 104 may include or be formed of porous high temperature ceramic insulation such as aluminum oxide (alumina), zirconium oxide (zirconia), mullite or aluminosilicate insulation.

The reactor tube 106 includes an inlet 112 and an outlet 114. The reactor tube 106 is oriented vertically with the inlet 112 located above the outlet 114. In some embodiments, the reactor tube 106 may be oriented at an angle. A portion of the reactor tube 106 extends through and is located within the reactor chamber 108. The interior of the reactor tube 106 is not open to the reactor chamber 108. The reactor tube 106 includes three zones: a recuperation zone 116, a reduction zone 118, and a quenching zone 120. The recuperation zone 116 is located above the reactor chamber 108, the reduction zone 118 is located within the reactor chamber 108, and the quenching zone 120 is located below the reactor chamber 108. The solid-state fuel pellets 102 are configured to flow downward through the reactor tube 106 from the inlet 112 to the outlet 114. In some embodiments, the reactor tube 106 may be formed of an outer sleeve of silicon carbide with an inner sleeve of aluminum oxide (alumina). In other embodiments, the reactor tube 106 may be formed of silicon carbide with an inner coating of aluminum oxide. In some embodiments, the reactor tube 106 may be formed of alumina oxide with a black coating on the exterior surface. Although a single reactor tube 106 is shown in FIG. 1, the plant 100 can be scaled by using multiple reactor tubes 106 within the reactor chamber 108.

A fuel storage device, such as for example, a hopper 122 may be coupled to the inlet 112 of the reactor tube 106. A quantity of spent solid-state fuel pellets 102 (also known as discharged or oxidized solid-state fuel pellets 102) requiring regeneration (thermal reduction) may be placed into the hopper 122 for processing. As shown in FIG. 1, in some examples, a lid 124 is provided to close the hopper 122. A collection device, such as for example, a collection tank 126 may be coupled to the outlet 114 of the reactor tube 106. The collection tank 126 is configured to store the charged solid-state fuel pellets 102 (also known as reduced solid-state fuel pellets 102) following processing.

Insulation 128 may surround the reactor tube 106, the reduction reactor 104, and/or the hopper 122. In some embodiments, the insulation 128 may also surround the collection tank 126. The insulation 128 may be any suitable insulation, including but not limited to, a stone wool insulation, a silica insulation, and/or an alumina insulation.

The solid-state fuel production plant 100 further includes a gas inlet 130 and a gas outlet 132. The gas inlet 130 is fluidly coupled with the reactor tube 106 proximate to the outlet 114 of the reactor tube 106. As shown in FIG. 1, the gas inlet 130 may be located in the collection tank 126. The gas outlet 132 is fluidly coupled with the reactor tube 106 proximate to the inlet 112 of the reactor tube 106. The gas outlet 132 may be located in the hopper 122. The gas inlet 130 is configured to deliver a low-oxygen gas to the reactor tube 106. The low-oxygen gas has a partial pressure of oxygen ($P_{O2}$) in a range from about 0.01 atm to about 0.05 atm. In some embodiments, the low-oxygen gas may be oxygen-depleted air or an inert gas, such as nitrogen or argon. While it may be advantageous to use an inert gas, a certain amount of oxygen could be tolerated. The gas outlet 132 is configured to exhaust an oxygen-enriched gas from the reactor tube 106. The gas preferably enters and exits the plant 100 at a cool temperature (e.g., at or near ambient temperature).

The solid-state fuel production plant 100 further includes a flow control mechanism 134 configured to control the flow of the solid-state fuel 102 through the reactor tube 106. In some embodiments, the flow control mechanism 134 may include, but is not limited to, a butterfly valve, a knife valve, or a porous knife valve. In some embodiments, the flow control mechanism 134 may be a pulsed air jet that moderates the flow of the solid-state fuel 102 through the reactor tube 106. In other embodiments, the flow control mechanism 134 can be a particle screw feeder.

In operation, the spent (oxidized) solid-state fuel 102 is fed from the hopper 122 at the top of the plant 100 downward (shown by arrows A), while cool low-oxygen gas is fed counter-currently into the plant 100 through the gas inlet 130 (shown by arrow B) where it flows from the bottom of the plant 100 upward (shown by arrows C). The solid-state fuel pellets 102 leave the hopper 122 and enter the reactor tube 106 through the inlet 112. In the recuperation zone 116 of the reactor tube 106, the solid-state fuel pellets 102 are pre-heated by hot oxygen-enriched gas flowing upward from the reduction zone 118. Heat from the low-oxygen gas is transferred to the descending solid-state fuel pellets 102 and further heats the solid-state fuel pellets 102 through direct contact. The rate of downward flow of the solid-state fuel pellets 102 is small (about 0.05 cm/s) to sustain a large residence time (about 15-20 minutes) through the reduction zone 118. When the solid-state fuel pellets 102 enters the reduction zone 118, the solid-state fuel pellets 102 are heated to a temperature above 1350° C., preferably to 1500° C. for rapid kinetics, by concentrated solar energy that enters the reactor chamber 108 through the aperture 110 (shown by arrows D). As the solid-state fuel pellets 102 continue to flow downward through the reduction zone 118, they undergo a highly endothermic reduction reaction with the low-oxygen gas flowing upward. A low $O_2$ partial pressure in the reduction zone 118 is maintained by the upward flowing low-oxygen gas. The low $O_2$ partial pressure enables enhanced energy storage capacity by enabling a further extent of reaction toward its thermodynamic limit. During the highly endothermic reduction reaction in the reduction zone 118, oxygen in the spent (oxidized) solid-state fuel 102 is dissociated from the solid and is entrained into the low-oxygen gas to form an oxygen-enriched gas and a charged (reduced) solid-state fuel 102. The thermochemical reaction is $2MgMn_2O_4 \leftrightarrow 4MnO + 2MgO + O_2$ ($\Delta H = 370\text{-}392$ kJ $mol_{O_2}^{-1}$). The use of the low-oxygen gas within the counter-flow falling-particle reactor enhances the energy storage capacity of the solid-state fuel 102 to 1360 MJm$^{-3}$ (double the energy storage capacity of molten salt).

After passing through the reduction zone 118, the solid-state fuel pellets 102 flow downward into and through the quenching zone 120. Within the quenching zone 120, the high temperature solid-state fuel pellets 102 are quenched (cooled down) by the low-oxygen gas flowing upward, while the low-oxygen gas heats up. The solid-state fuel pellets 102 are then discharged through the outlet 114 of the reactor tube 106 into the collection tank 126 at or near ambient temperature. The low-oxygen gas exiting the quenching zone 120 passes through the reduction zone 118, entraining oxygen from thermal reduction. The now oxygen-enriched gas exits the reduction zone 118 at temperature greater than 1350° C. The high-temperature gas flows through the recuperation zone 116 to preheat the solid-state fuel pellets 102 before thermal reduction, cooling down the gas. The cool oxygen-enriched gas is then exhausted from the plant through the gas outlet 132 (shown by arrow E).

The low-oxygen gas flowing into the plant 100 serves at least three functions. First, it quenches the reduced solid-state fuel 102 flowing through the quenching zone 120 and prevents re-oxidation of the solid-state fuel 102. Second, it removes oxygen from the solid-state fuel 102 passing through the reduction zone 118. Third, as the hot gas passes through the recuperation zone 116, the gas heats up and moves upward to preheat the descending solid-state fuel 102.

Stated another way from the perspective of the solid-state fuel 102, the solid-state fuel 102 enters the reactor tube 106 at or near ambient temperature and is pre-heated in the recuperation zone 116 by hot oxygen-enriched gas flowing upward through the reactor tube 106 from the reduction zone 118. The solid-state fuel 102 is further heated in the reduction zone 118 by concentrated solar energy entering the reactor chamber 108, where through the chemical reaction with the low-oxygen gas flowing upward, the solid-state fuel 102 loses oxygen to the low-oxygen gas to become a charged (reduced) solid-state fuel 102. The charged solid-state fuel then cools in the quenching zone 120 by transferring heat to the low-oxygen gas, and is finally deposited into the collection tank 126 at or near ambient temperature.

Additionally, from the perspective of the gas, during the process, the gas enters the collection tank 126 via the gas inlet 130 with a low-oxygen concentration at or near ambient temperature. The gas is pre-heated in the quenching zone 120 by the heated solid-state fuel pellets 102 flowing downward in the reactor tube 106. The gas is further heated in the reduction zone 118 by concentrated solar energy entering the reactor chamber 108, where through a thermochemical reduction reaction, the solid-state fuel 102 releases oxygen, where it becomes entrained in the gas to become an oxygen-enriched gas. The oxygen-enriched gas is then cooled in the recuperation zone 116 by transferring heat to the solid-state fuel pellets 102, and then is exhausted out the gas outlet 132 at or near ambient temperature. In some embodiments, after the oxygen-enriched gas exits the gas outlet 132, it can be subjected to an oxygen removal process and can then be fed back into the plant 100 through the gas inlet 130 as a low-oxygen gas.

Figure 3:
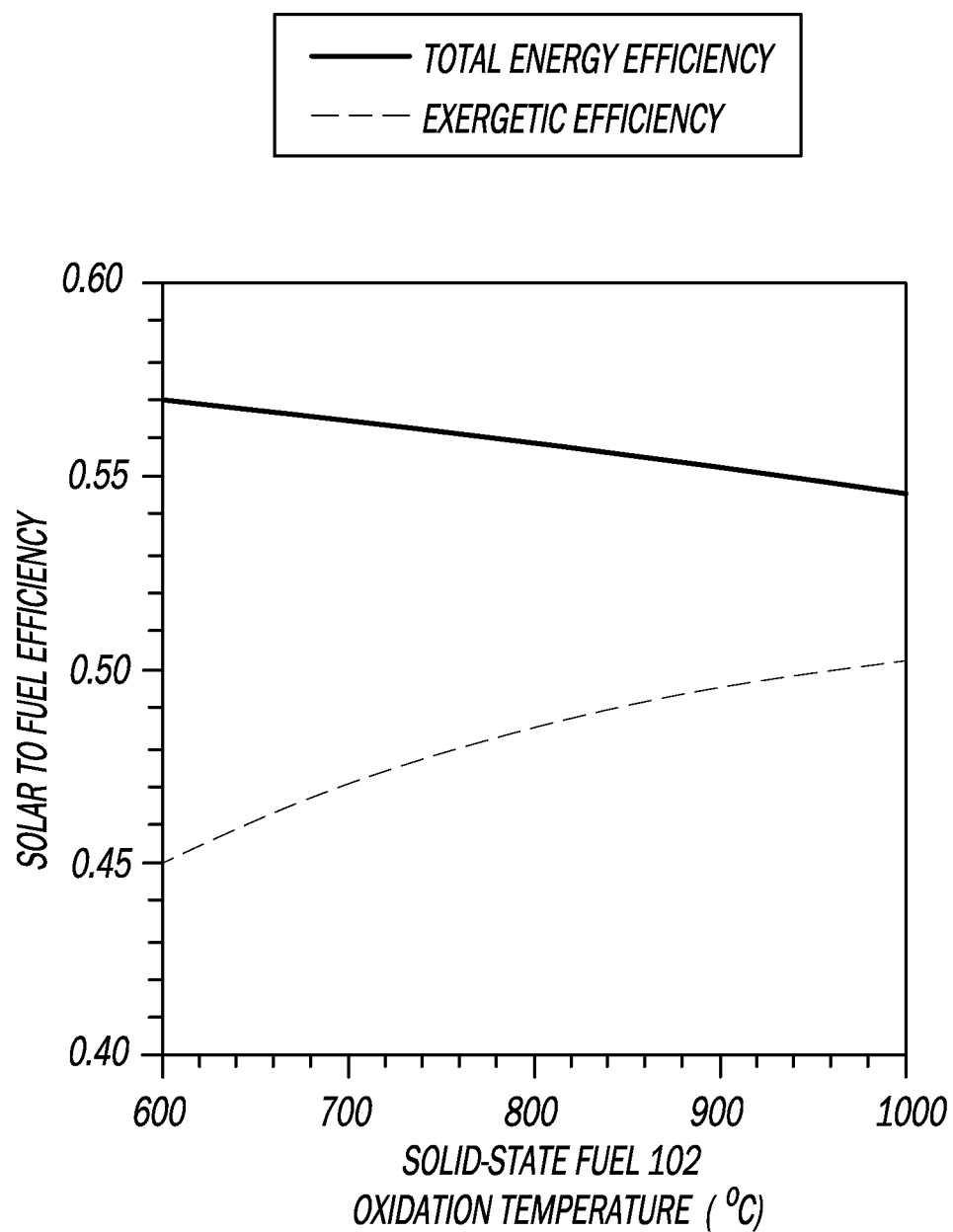
FIG. 3 is a graph of solar to fuel conversion efficiency.

FIG. 3 is a graph of the solar to fuel efficiency against the solid-state fuel 102 oxidation temperature that illustrates that instead of using reactive metal oxides to split water and $CO_2$, which is inefficient and may be years away from commercialization, the reactive metal oxide itself is a solid-state fuel. The modeling shown in FIG. 3 indicates that the solar to fuel conversion efficiency with the solid-state fuel 102 can be as high as 54% with an energy storage cost less than $5 kWh$^{-1}_{thermal}$. At 1000° C., the total energy efficiency of the solid-state fuel 102 is about 0.54 and the exergetic efficiency is about 0.50. The solid-state fuel 102 allows decoupling of the solar field and optics from the power block. The state of technology development can make the solid-state fuel 102 commercially viable within 3-5 years. This novel "Beyond Batteries" alternative to traditional CSP thermal energy storage will extend the reach and relevance of CSP beyond the restricted footprint of the CSP plant, and can provide a significant boost to the CSP industry. The solid-state fuel 102 can be transported long distances from the solar field to a remote power block with little to no loss of energy of the solid-state fuel 102.

Figure 4:
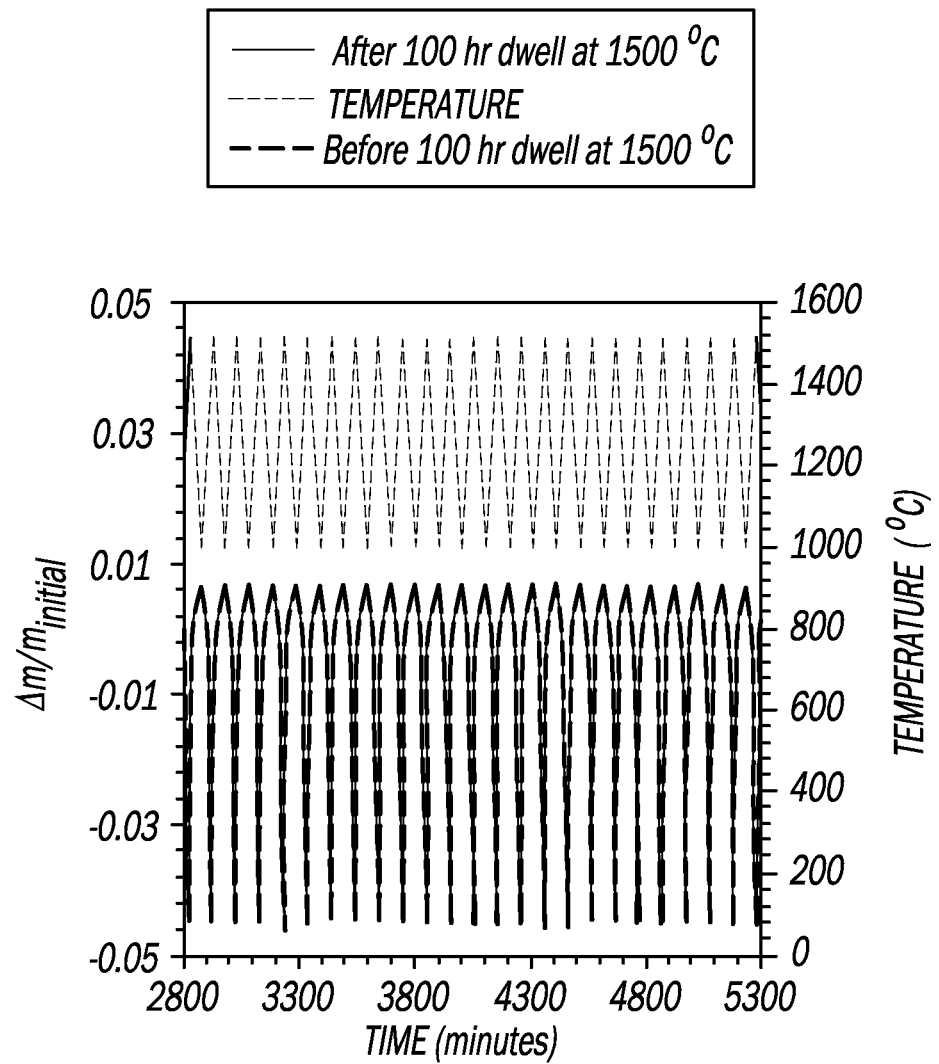
FIG. 4 is a graph of the present solid-state fuel cycled in a thermogravimetric analysis ("TGA") between 1000 and 1500° C. under $P_{O2}$ of 0.01 atm (reduction) and $P_{O2}$ of 0.91 atm (oxidation)

The solid-state fuel 102 remains stable over many cycles in the operating temperature range and can be reused many times as a fuel source without degradation. It is expected that the solid-state fuel 102 can be cycled thousands of times before the end of its useful life. The magnesium manganese oxide solid-state fuel 102 has a measured energy density (based on enthalpy of reaction) as high as 1360 $MJm^{-3}$. The thermochemical reaction $2MgMn_2O_4 \leftrightarrow 4MnO+2MgO+O_2$ ($\Delta H=370-392$ kJ $mol_{O_2}^{-1}$) reversibly occurs in air at high temperatures (>1000° C.). Reactive stability studies of magnesium manganese oxides with different Mn/Mg molar ratios indicate high thermochemical stability upon cycling between 1500 and 1000° C. in air under atmospheric and reduced pressure conditions. This can be inferred from the stable oxygen absorption and release rates of a sample prepared using Mn/Mg=1 when cycled between 1500 and 1000° C. in a TGA, as shown in FIG. 4. The use of a low-oxygen gas, such as for example, oxygen-depleted-air (0.01 atm<$P_{O_2}$<0.05 atm), within the counter-flow falling-particle reactor of the plant 100 enhances the energy storage capacity of the solid-state fuel 102 and allows for heat recuperation and ambient temperature storage.

A preliminary techno-economic analysis has examined the economic viability of the solid-state fuel 102 for long duration storage. The total material cost of the solid-state fuel 102 includes raw materials, synthesis costs, and energy costs for synthesis. The total material cost is $620/ton for Mg/Mn 1:1. The total storage cost includes the capital costs for materials, production reactor, subsystems, and holding bin, and the operation and maintenance costs for the reactor and subsystems. A thirty-year lifetime is assumed for all components with a discount rate of 3.1%.

Figure 5:
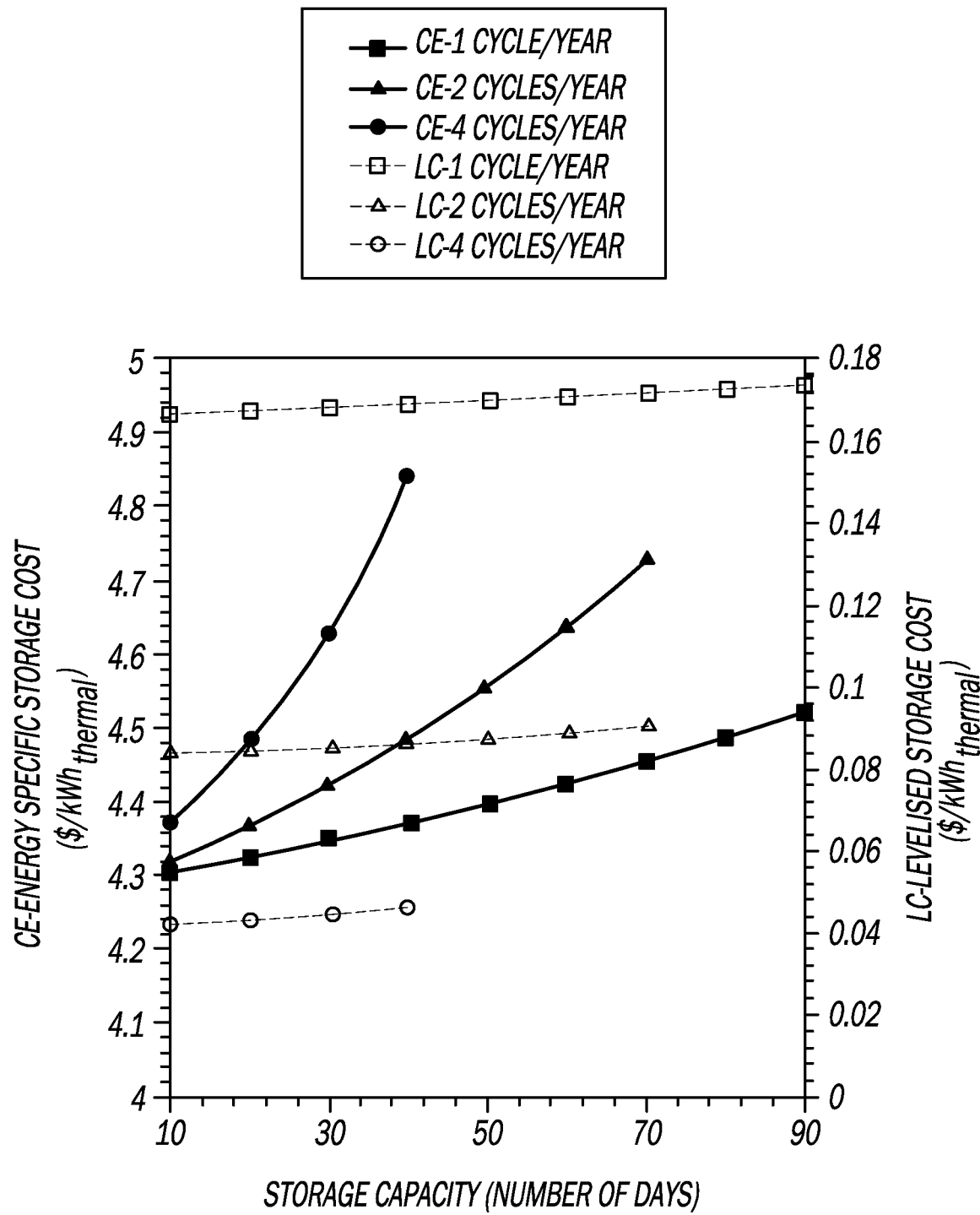
FIG. 5 is a graph of the estimated energy specific storage cost and levelized storage cost of the present solid-state fuel.

FIG. 5 shows estimated storage cost (CE, the capital cost for (usable) energy-specific components) and levelized cost (LC) for long term storage for the solid-state fuel 102. The results shown in FIG. 5 assume that there are 8 hours of usable sunlight for each day of on sun operation. It is further assumed that the plant 100 is in operation for each day a 100 MW power block is not in operation (i.e., for 90 days of storage at 3 cycles per year, the plant 100 operates for 365−90×3=95 days). Although it appears counterintuitive, FIG. 5 shows that as the number of seasonal cycles increases, the energy storage cost increases. This is because a larger plant 100 is required to meet the 100 MW power requirement since the number of on sun operational days decreases. In all cases considered, the energy storage cost is below <$5/kWh_{thermal}$. This is well below the cost of state-of-the-art molten salt storage ($26/kWh_{thermal}$) and the Department of Energy target for Gen3 CSP systems ($15/kWh_{thermal}$). It is also noteworthy that for four seasonal cycles the levelized cost of storage is below $0.05/kWh_{thermal}$. These preliminary cost calculations show that the solid-state fuel 102 promises to be a viable route to low-cost, long-duration/seasonal energy storage. A power block using the solid-state fuel 102 would receive an additional clean energy credit and an energy storage credit in certain markets. Since the power block can be de-coupled from the solid-state fuel 102 production, it is possible to operate the power block and plant 100 simultaneously.

The systems, apparatuses, and methods described herein may provide significant advantages. For example, the plant 100 is a continuous-flow solar reactor that produces the solid-state fuel 102. The production of the solid-state fuel 102 provides a long duration storage option for solar thermal energy.

Additionally, a solid-state fuel 102 is produced that can be easily transported, the solar field and plant 100 can be physically decoupled from the power block, which has many operational and cost advantages; for example many small scale plants can be developed and distributed as needed, as opposed to a large gigawatt scale plant. The solid-state fuel 102 may be used as a drop-in replacement for coal in a coal plant. Thus, instead of shutting down a coal-fired power plant, the solid-state fuel 102 may be used instead of coal. Oxidation of the solid-state fuel 102 produces no carbon emissions.

Further, the inert gas flowing through the plant 100 in a counter flow mode serves at least three purposes: (1) it provides a low-oxygen environment and sweeps away any oxygen released during thermal reduction; (2) it prevents re-oxidation of the solid-state fuel 102; and (3) it provides heat recuperation, so that heat from the falling solid-state fuel pellets 102 leaving the reactor is recovered and the heat is transferred to cold solid-state fuel pellets 102 entering the reduction reactor 104. This has a huge engineering benefit in that the entrance and exit to the reduction reactor 104 are at low temperature compared with the midsection of the reduction reactor 104 exposed to 1500° C. in the solar furnace. The counter flow arrangement allows for efficient recuperation of heat transferred to the solid-state fuel 102. That is, the solid-state fuel 102 as well as the inert gas enter and leave the reactor tube 106 at close to ambient temperature.

The inherent elegance of the plant 100 lies in the fact that both inlet 112 and outlet 114 of the reactor tube 106 are at close to ambient temperature, thus avoiding handling of high temperature solids and gases as well as high temperature sealing issues normally encountered in solar reactors. Due to the counter flow configuration, direct contact heat exchange occurs between the solid-state fuel 102 and the gas introduced into the plant 100; the only high temperature zone is within the reactor chamber 108. This design greatly simplifies the reactor operation and reduces the capital cost since materials capable of withstanding high-temperatures (e.g., ceramics) are only required within the reduction zone 118. Further, the solid-state fuel 102 and the plant 100 is transformative for long-duration solar energy storage due to its scalability, low cost of Mg—Mn—O, and the ability to store energy in the form of a solid-state fuel that is non-toxic (safe to handle), non-reactive at low temperature, carbon-neutral, and inexpensive to store and transport.

Figure 6:
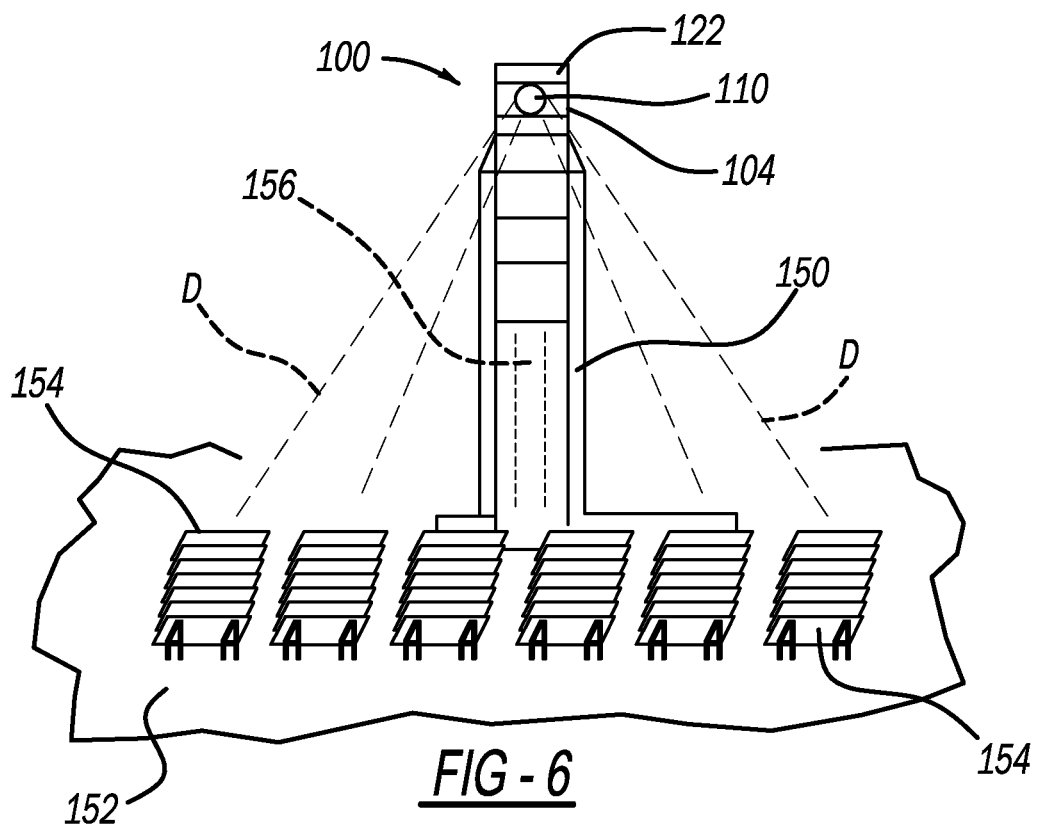
FIG. 6 is a diagrammatic view showing the plant in a solar concentrating facility including solar reflectors and a solar tower within which is a reduction reactor and optionally a splitting reactor.

Referring to FIG. 6, a solar collector tower 150 employs any of the plant or furnace embodiments disclosed herein. Tower 150 vertically extends above the ground 152 upon which are mounted an array of movable heliostat mirrors 154 that track the sun. Mirrors 154 reflect and focus solar emitted light rays D in a concentrated manner upon aperture 110 of furnace 104 within plant 100. An elevator or a series of conveyor buckets 156 are used for transporting the pellets up the tower to hopper 122, although a continuously feeding auger or the like may alternately be used.

Figure 7:
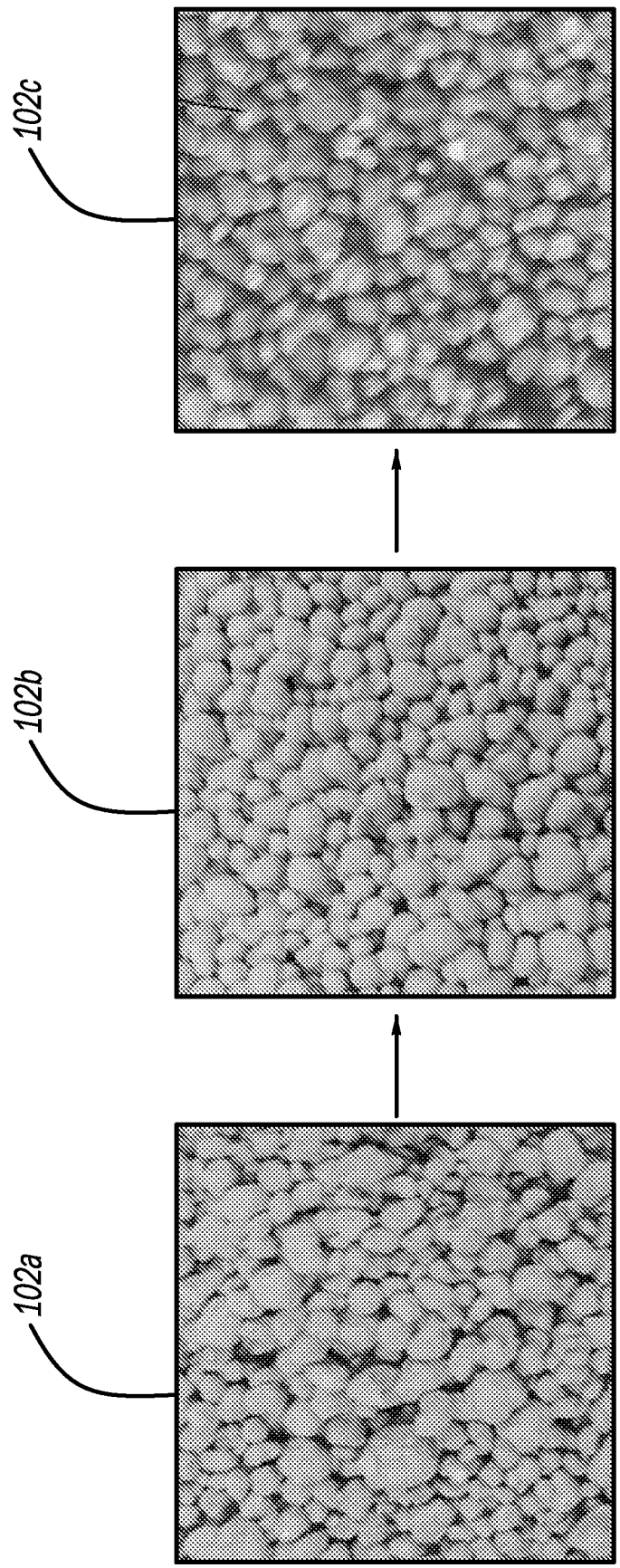
FIG. 7 is a series of microphotographs showing manufacturing steps for the present solid-state fuel for use in any of the present reduction reactors.

FIG. 7 illustrates a manufacturing process of pellets as they are initially disk pelletized at 102a, then spheronization occurs at 102b, and they are subsequently heat treated at 102c before being placed into the hopper of the reactor. This synthesis of solid-state fuel preferably creates generally spherically rounded pellets, without sharp edges, each having an average diameter of about 3 mm. This size and shape of fuel pellets or particles advantageously allows space between the pellets for counter-flowing gas therethrough while being optimal for continuous gravity feeding through the reactor and subsequent plants without clogging. A disk pelletizer model EL1 from Eirich has been found suitable.

Figure 8:
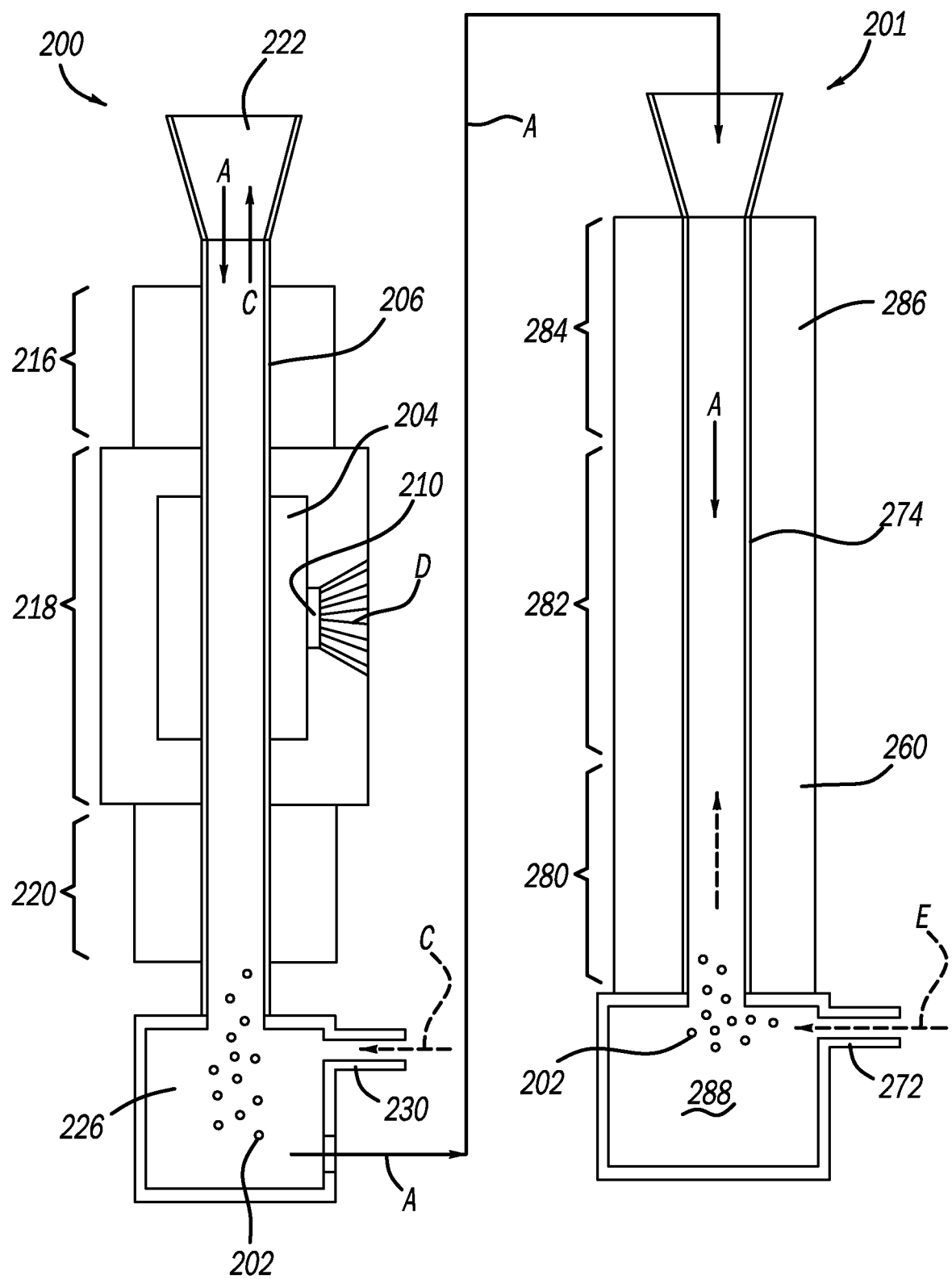
FIG. 8 is a diagrammatic view showing a second embodiment plant including the reduction reactor and an oxidation reactor.
Figure 9:
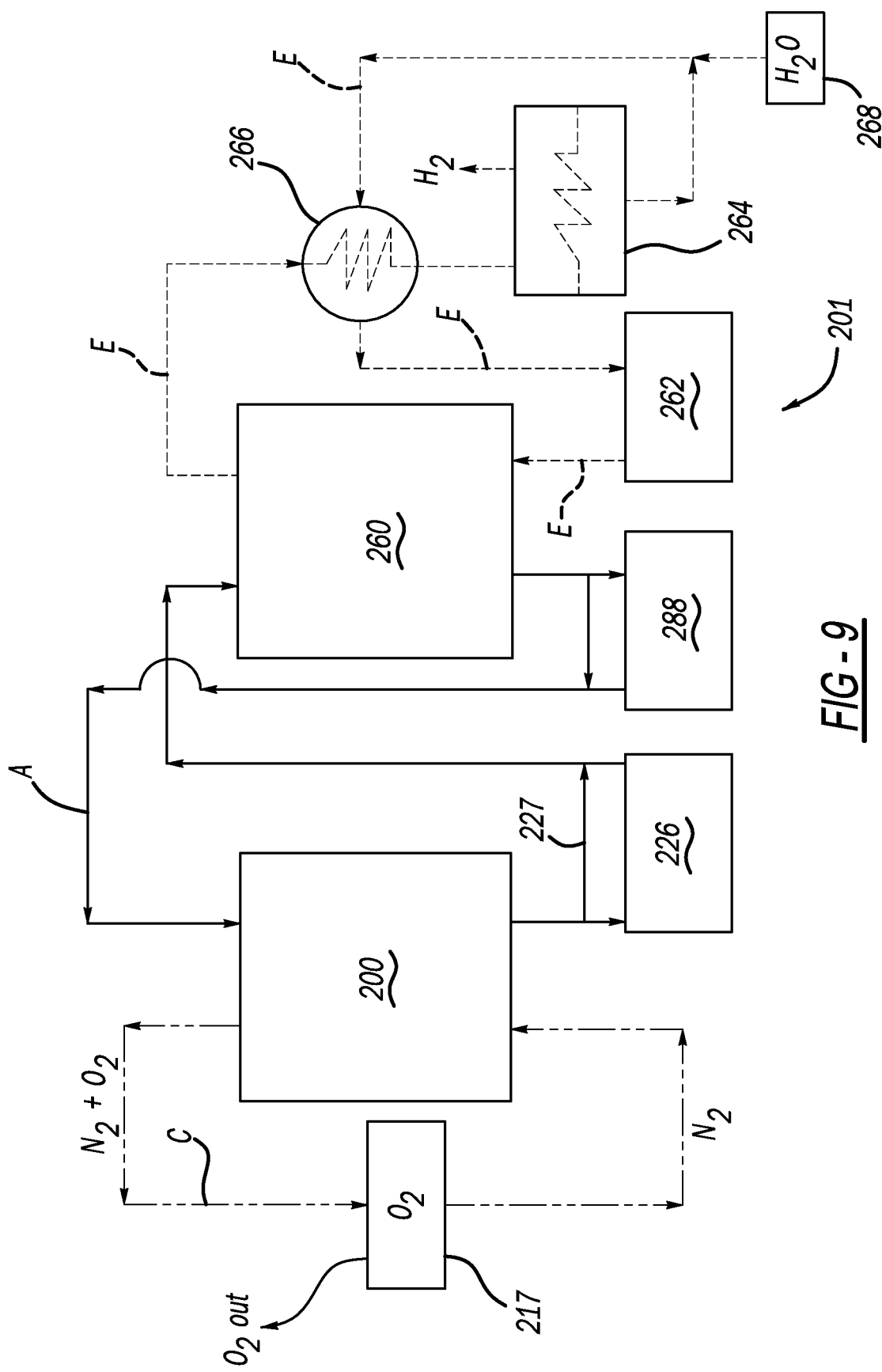
FIG. 9 is a process flow diagram for the second embodiment plant.

A second embodiment CSP is shown in FIGS. 8 and 9 and includes a reactor plant 200 and a fuel usage plant 201 for processing solid fuel pellets 202, also known as workpieces or particles. This second embodiment apparatus causes a thermochemical reduction of the pellets, which are preferably porous magnesium iron oxide (Mg—Fe—O), doped or undoped, also known as magnesioferrites, and a subsequent production of hydrogen via oxidation of the reduced fuel material using steam. Reduction reactor plant 200 includes an inlet hopper 222, an exit collection tank or area 226, and a reactor chamber or solar furnace 204 with an aperture 210 configured to receive concentrated solar energy D. Furthermore, a generally vertically elongated reactor tube 206 extends between and connects hopper 222 and collection tank 226. Reactor tube 206 includes a recuperation or pre-heating zone 216, a reduction or charging zone 218, and a quenching or cooling zone 220, where the reduction zone area of the reactor tube passes through the reactor chamber.

First, fresh or reused, spent and oxidized solid-state pellets 202 are continuously gravity fed from inlet hopper 222 and down reactor tube 206, as denoted by arrow A, while a low-oxygen gas flows up the reactor tube, as denoted by arrow C. An exemplary low-oxygen gas is about 96-99.99% pure nitrogen. Second, the high-temperature, oxygen-enriched gas flows through pellets 202 in recuperation zone 216 to pre-heat the incoming oxidized pellets before thermal reduction; this serves as an initial gas-to-workpiece heat exchanger. An ancillary gas or air heater may be optionally used to heat up the gas and/or pellets in the recuperation zone during initial start-up before the heat exchange is self-sustaining.

Third, pellets 202 undergo a highly endothermic reduction reaction in reduction zone 218 (maintained at temperatures >1350° C.), where the pellets and gas flow in opposite directions within reaction tube 206 inside solar furnace 204. In this area, oxygen in the oxidized pellets is separated (see box 217 in FIG. 9) and entrained into the low-oxygen gas flowing therepast at C, thereby forming an oxygen-enriched gas and thermochemically reduced or charged pellets 202. These reduced and charged pellets thereafter serve as oxygen-depleted or deprived particles or workpieces with fuel energy stored potential stored therein. An exemplary and non-limiting numerical value that can be used to shown how much energy is stored in a completely charged pellet is 865 kJ/kg+/−7.6%. An exemplary and non-limiting dwell time of the pellets within the solar furnace of the reduction zone is at least five minutes at 1500° C. and at least twenty minutes at 1400° C.

Fourth, as the reduced and charged fuel pellets 202 downwardly move within quenching zone 220, the oxygen-depleted pellets are quenched or cooled by the low-oxygen gas, while in turn, the pellets exchange heat to heat up the gas flowing therepast. The reduced and charged pellets 202 are then either temporarily stored in collection tank 226 or are continuously transported along flow path 227 to subsequent generator plant 201 via batch loaded transportation vehicles if remote, or along automatically fed conduits or conveyors if nearby.

Advantageously, both the reactor tube inlet and outlet, and the incoming and outgoing fuel pellets and gas, are all at close to ambient or room temperature (for example, within +/−100° C. of the room temperature target of 24.5° C.), thus avoiding conventional difficulties in handling high temperature solids and gases as well as conventional high temperature hardware sealing issues. Due to the counter-flow configuration of the pellets and gas, direct contact heat exchange occurs between the solids and gases in the only high temperature zone, which is within the reactor or furnace cavity. No heat-exchanging hardware is required after the plant reaches a steady-state condition. The present design greatly simplifies the reactor operation and reduces the capital cost since ceramic tubing is only required within the reduction zone. Therefore, less expensive and more easily sealed metal alloy tubes can be used in recuperation zone 216 and quenching zone 220, such as exemplary Hastelloy X nickel based alloy material, Haynes® 214® nickel-chromium-aluminum-iron alloy material, MA 957 ferritic alloy material, and Inconel® austenitic nickel-chromium based alloy material. That said, ceramic material may be used for a single piece, entire reactor tube 206 running through all of the zones if thermal expansion differences create a concern for sealing metal-to-ceramic joints.

The ambient temperature of the exiting fuel pellets simplifies handling, storage and transportation in low cost tanks, containers and vehicle cargo receptacles, which may be open to the air or optionally sealed in bags. This low temperature and oxygen-depleted fuel is beneficially stored for long durations without significant degradation (for example, less than a 10% loss) of energy potential within the fuel pellets when stored for at least two months, and more preferably at least five months. This makes long distance and slow transportation of the charged fuel possible, such as by train, ship or truck. Similarly, the ambient temperature of the exiting gas prevents system energy loss, increases heat-transfer efficiencies, and reduces undesirable thermal pollution if the gas is released to the environment.

Fuel usage plant 201 acts to extract and discharge stored energy or heat from charged and oxygen-depleted fuel pellets 202 subsequent to and downstream from the fuel pellets being charged in CSP reactor plant 200. Fuel usage plant 201 includes an oxidation reactor 260 to which are coupled a steam generator 262, a condenser 264, external heat-exchanger hardware 266 and a water source 268. A steam flow path E is along pipes connecting the steam components. Water flows from a holding tank or other source 268 to external heat-exchanger hardware 266 and then to steam generator 262, whereafter the steam enters a steam inlet 272 of oxidation reactor 260, and upwardly flows into an oxidation tube 274.

The present oxidation reactor 260 is essentially the reverse operation of the thermochemical reduction process described hereinabove. In the present oxidation reactor 260, reduced particles or pellets 202 continuously move in a generally vertically downward direction while steam oppositely moves in an upward direction. Steam enters from the bottom of tube 274 at a temperature of 200° C. or less, and recuperates heat from the oxidized pellets in a heat-exchanging quenching zone 280. As the steam subsequently reaches an intermediate oxidation or reaction zone 282, it reacts with the reduced pellets flowing therepast to produce hydrogen. The oxidation reaction being exothermic, supplies the energy required from the fuel pellets 202 to heat up the steam to desired oxidation temperatures greater than 800° C. As the hydrogen and unreacted steam mixture upwardly discharge from oxidation zone 282, it heats the falling reduced pellets in a heat-exchanging recuperation zone 284.

There is no need to handle hot gases or solids in oxidation reactor 260, much like solar reduction reactor 200, since only the oxidation zone is at high temperature and the exiting pellets and hydrogen are generally at ambient temperature. Because the temperature is not expected to exceed 1000° C. in any of the zones of oxidation reactor 260, metallic super alloys can be used for all of the zones and ceramics are not required. Furthermore, an insulator 286 surrounds tube 274 and a collection tank 288 receives and temporarily stores the spent and oxidized pellets 202 discharged from quenching zone 280 of oxidation reactor 280 for later transportation and reuse at reduction reactor 200. It is also noteworthy that the steam can freely flow through the workpiece pellets due to the size of the pellets and since the porosity of the pellets in the tube is at least 36% of the total with pore or spacing of about 3-4 mm between pellets; therefore the upwardly moving steam pressure drop should be less than 2.5 psi for a two inch diameter tube, pellet flow rate of one gram/second and steam (or gas) counter-flow rate of fifty liters/minute.

The split hydrogen and steam exiting an upper portion of tube 274 are transferred to external heat exchanger hardware 266 and then to condenser 264. A fluid coolant and fan are used in the condenser. This serves to separate the split hydrogen from the mechanically (not chemically) intermixed steam, for subsequent transmission of the hydrogen to a downstream processing plant or storage, and the now water back to source 268. Remaining heat removed from the steam-to-water conversion is fed back to the steam generator.

Reverse reaction in the oxidation reactor is performed in a similar manner to that in the reduction reactor but at lower temperatures using the steam and previously reduced fuel material. Steam acts as the recuperating gas and the oxidizing agent. Oxidation of the reduced material with steam results in formation of hydrogen. Therefore, hydrogen is separated from excess steam via condensation as stated hereinabove. The heat lost from cooling down the pelletized reactive material is recuperated using the counter-flow falling bed reactor configuration.

It is noteworthy, however, that conventional pure iron oxide is not suitable for high temperature reactions (>1000° C.) due to sintering concerns. In contrast, the present method and apparatus have mitigated the risk of sintering by mixing iron oxide with magnesium oxide. This not only stabilises the material for thermochemical cycling, but also lowers the temperature required for thermal reduction of the iron oxide. Oxides with a Mg/Fe molar ratio of 1:2 tend to form $MgFe_2O_4$ spinel. Therefore, the present approach finds excess MgO (Fe/Mg<2) is desireable to provide a stabilizing effect and avoid sintering. Simplified chemical reactions for solar thermochemical water or carbon dioxide splitting using excess MgO in $MgFe_2O_4$ are given by:

Thermal reduction: $MgFe_2O_4 +$ (1)

Oxidation: $(1+\varepsilon)MgO + xFeO + (2-x)FeO_{1.5} +$ (2)

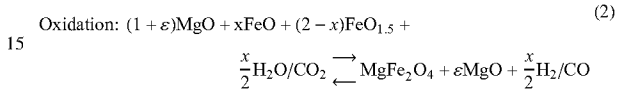

Figure 14:
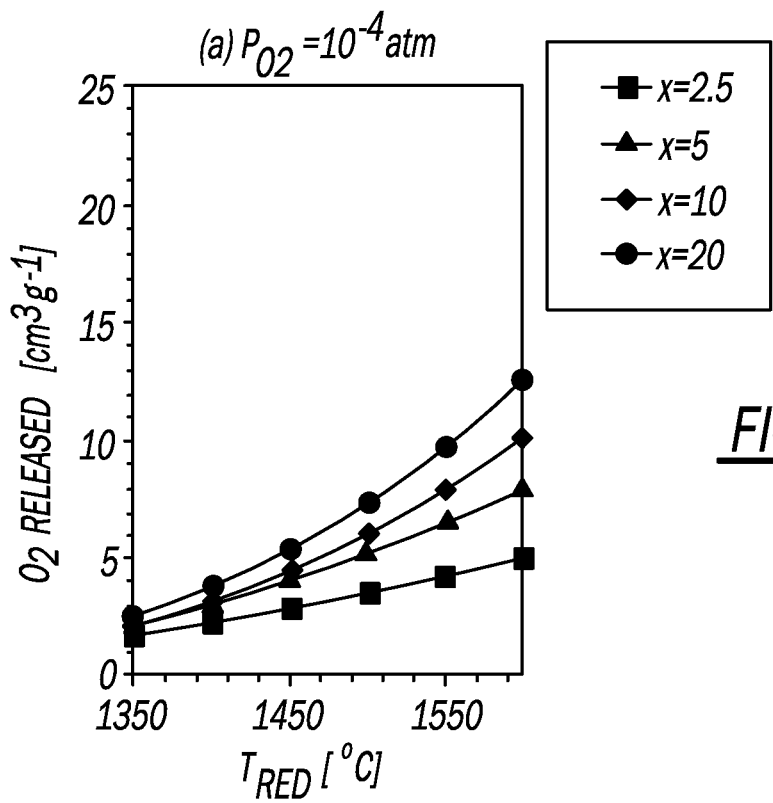
FIGS. 14 and 15 are graphs showing the amount of $O_2$ released for the second embodiment plant.
Figure 15:
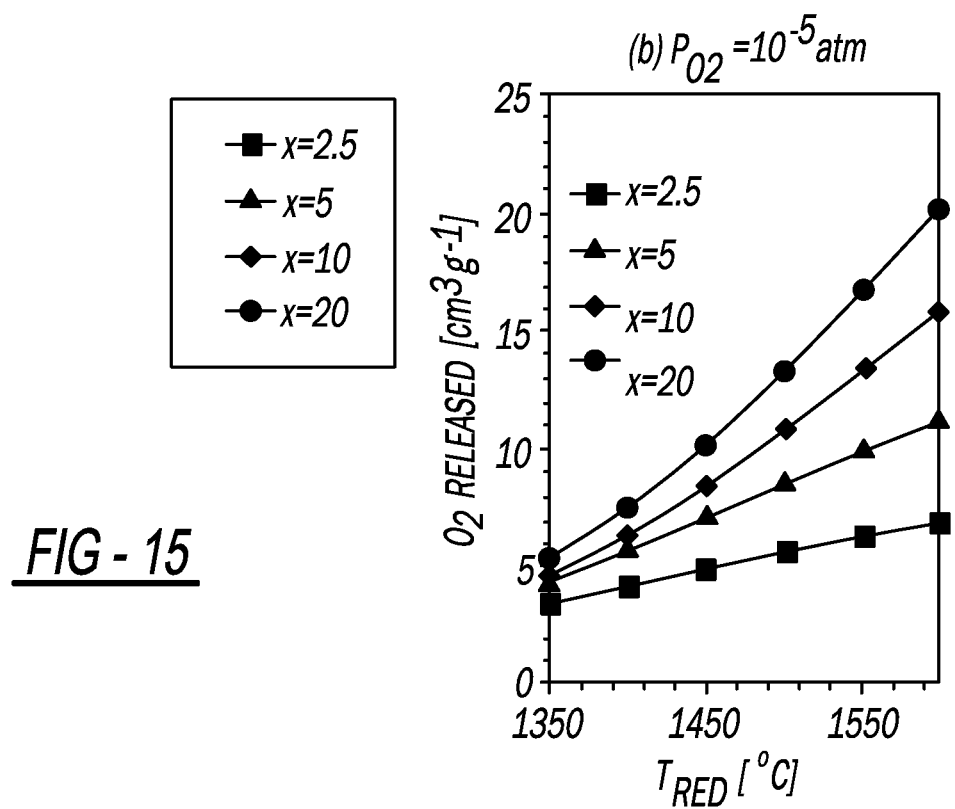
Figure 16:
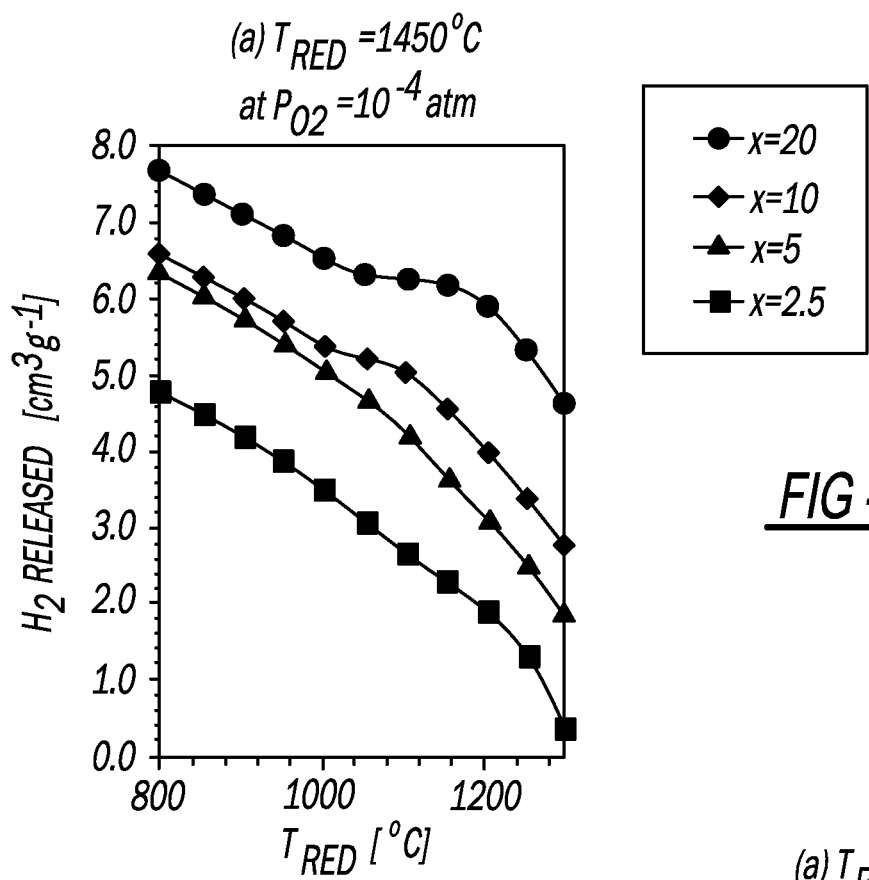
FIGS. 16 and 17 are graphs showing the amount of $H_2$ released for the second embodiment plant.
Figure 17:
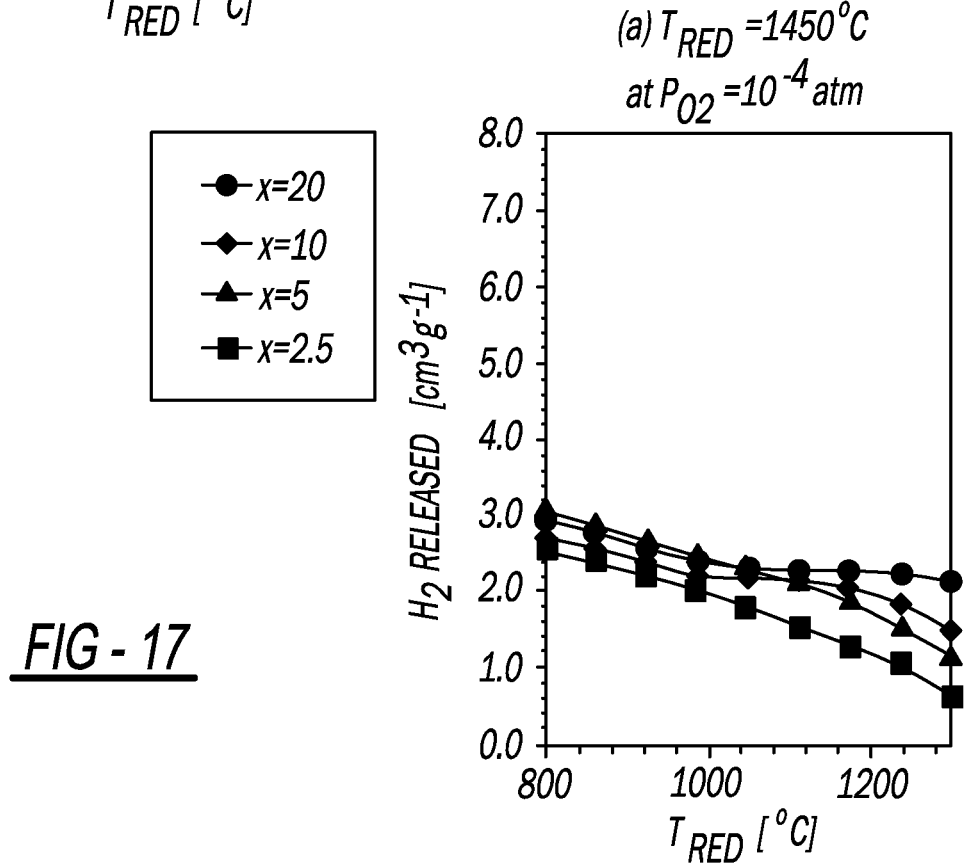

FIGS. 14 and 15 show the expected results from a CALPHAD based thermodynamic model to calculate the amount of $O_2$ released from materials prepared from x mole % $Fe_3O_4$ in MgO (x=2.5, 5, 10 and 20) at $O_2$ partial pressures between 1 to $10^{-5}$ atm. This graphs the amount of $O_2$ released when reduced under $O_2$ partial pressure ($P_{O_2}$) of $10^{-4}$ and $10^{-5}$ atm for different formulations. FIGS. 16 and 17 illustrate the same CALPHAD model used to calculate the expected amount of $H_2$ that can be produced at thermodynamic equilibrium after the materials have been reduced at 1350 and 1450° C. under an $O_2$ partial pressure of $10^{-4}$ atm and oxidized with steam four times the mass of the material.

Figure 18:
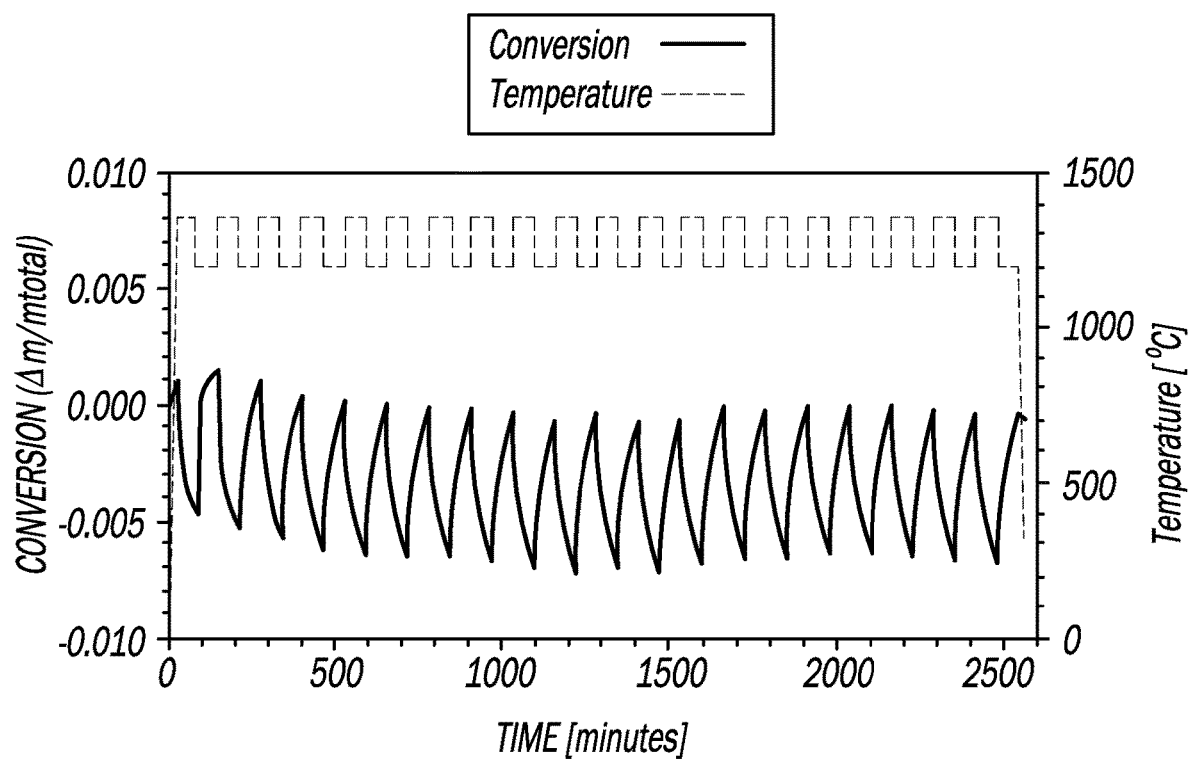
FIG. 18 is a graph showing TGA conversion and temperature versus time over twenty cycles for the second embodiment plant.

Reactive stability studies of magnesium iron oxides with different Fe/Mg molar ratios indicate high thermochemical stability upon cycling between 1500 and 1000° C. This can be inferred from the stable oxygen absorption and release rates of a sample prepared using Fe/Mg=3/4 when cycled between 1350 and 1200° C. in a TGA, as represented in FIG. 18. The productivity of Mg—Fe-oxide (Fe/Mg=3/4) is exceptionally high and stable compared to other state of the art water splitting materials such as ceria. The average CO production (oxidation performed using $CO_2$) in the last 10 cycles is 8.9 $cm^3g^{-1}$ with $O_2$ partial pressure varying from $1.56\times10^{-5}$ to $4\times10^{-4}$ atm. Furthermore, reactive material prepared using 20 mole % magnetite in magnesium oxide was found to be suitable for water splitting at reduction temperatures as low as 1350-1450° C. The material is easily reduced at 1450° C. under an $O_2$ partial pressure of ~$10^{-4}$ to $10^{-5}$ atm and produces 6.12±0.02 $cm^3g^{-1}$ of $H_2$ per cycle when oxidized with steam at 1200° C. Cerium dioxide produces 2.91/4.34 $cm^3g^{-1}$ of $H_2$ per cycle when reduced at 1500° C./1450° C. and oxidized at 1200° C.

It is desired to heat capacity match the reactor plant. Efficiency of a solid fuel production unit is maximum when the heat capacities of gas and solid feed are equal. Mathematically this is given by:

$$\dot{m}_{solid}C_{p,solid} = \dot{m}_{gas}C_{p,gas} \quad (3)$$

where $\dot{m}_{solid}$ and $\dot{m}_{gas}$ are the mass flow rates of solid and gas, and where $C_{p,solid}$ and $C_{p,gas}$ are the specific heat capacities of the solid and gas, respectively.

The hydrogen processing plant may include: fuel cells in an electrical power plant, a hydrogen powered turbine for an electrical power plant, or a chemical processing plant such as for making ammonia, hydrochloric acid, fat hydrogenation, chemical reduction of metallic ores, hydrodealkylation, hydrodesulphurization, petrochemical hydrocracking, and for breaking silicon or carbon bonds for making semiconductors. It is alternately envisioned that the fuel usage plant may discharge the fuel pellets for other manufacturing processes unrelated to hydrogen splitting such as in a fluid heater, a cement or asphalt kiln, a glass or steel furnace, or the like. In another configuration, a different counter-flowing gas or other fluid may be used in the oxidation reactor instead of steam if the oxygen-depleted fuel is employed for alternate processes, although some of the preferred hydrogen splitting benefits may not be achieved.

Figure 11:
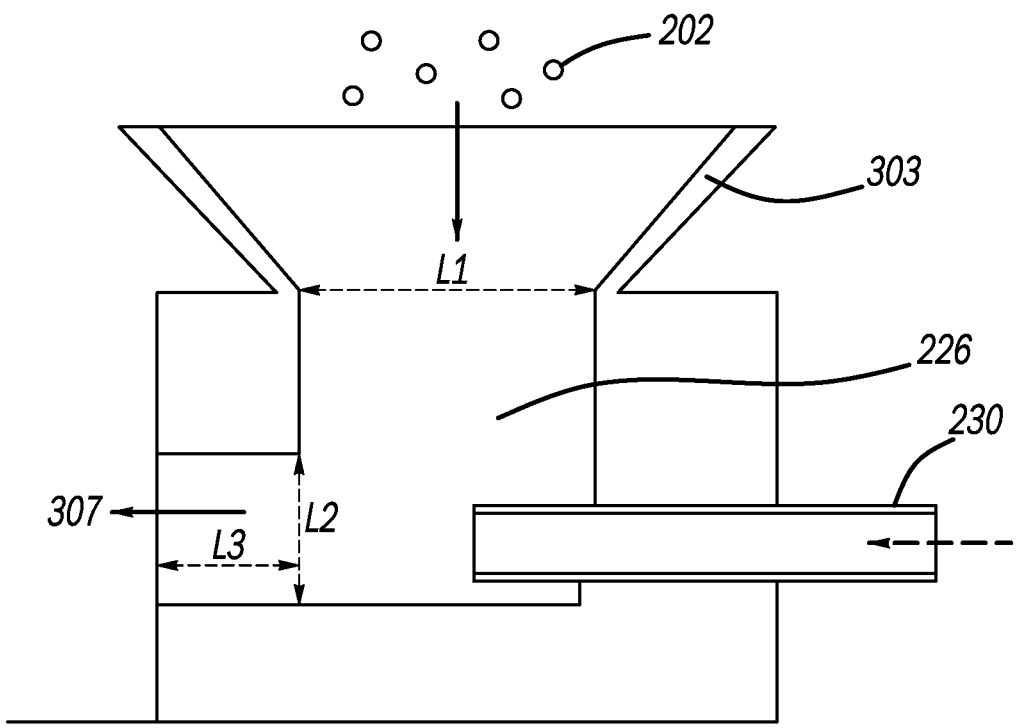
FIG. 11 is an enlarged and partial diagrammatic view showing the control system of FIG. 10.
Figure 12:
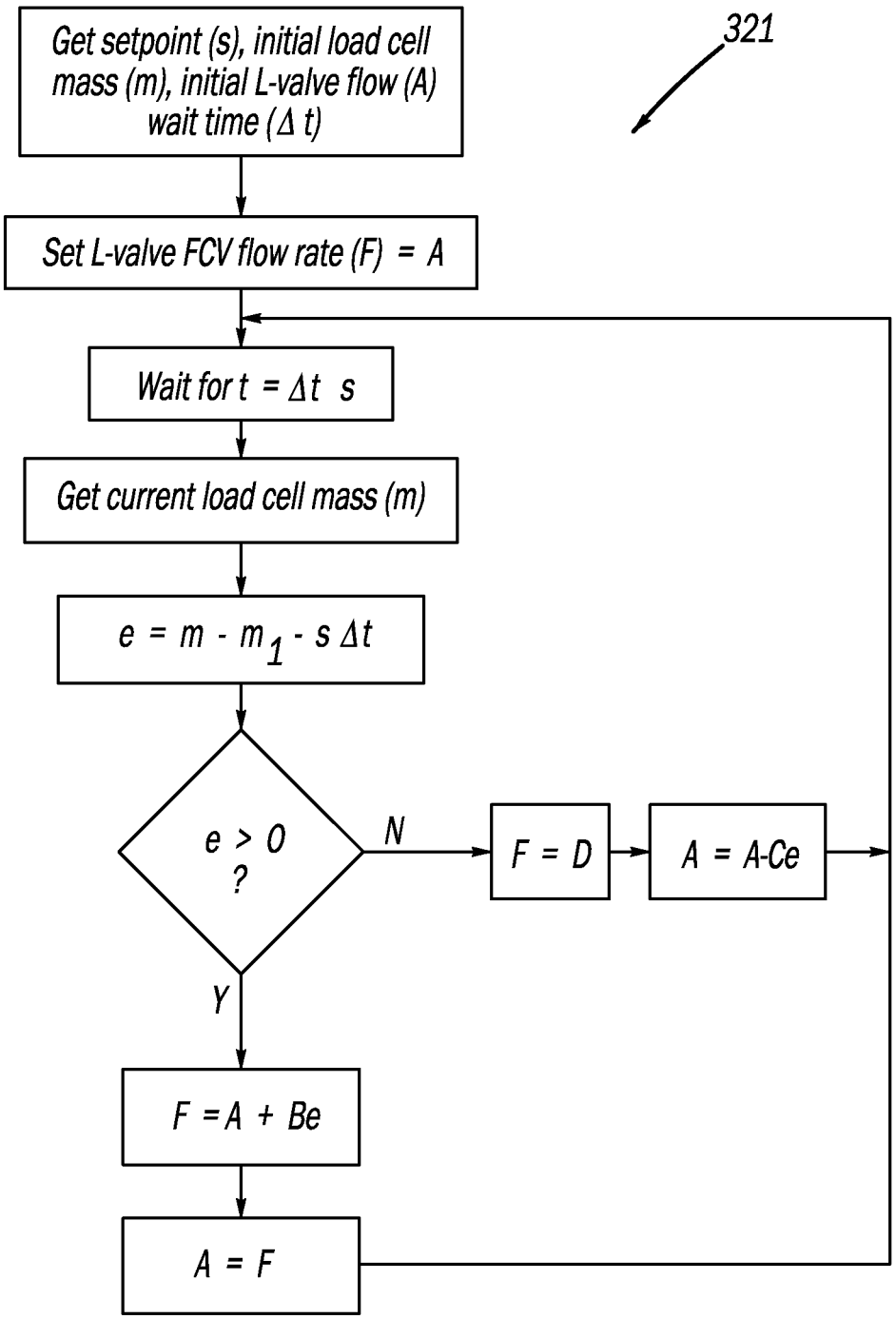
FIG. 12 is a software logic diagram for use with the control system of FIGS. 10 and 11.

FIGS. 10-12 illustrate a non-mechanical, flow-control valve system 290 for controlling the downward flow of solid fuel pellets or particles 202 as they continuously move through and exit reactor tube 206. Valve system 290 includes a constant gas inlet 291, a pulsating gas inlet 292, a compressed gas supply tank 293 and a programmable computer controller 294. A pulsing piping circuit 295 includes a flow control valve 311, a cycling valve 296 which automatically opens and closes in a repetitively pulsating manner by an electromagnetic solenoid 297, and a downstream flow meter 298, which operably transmit the low-oxygen nitrogen gas from supply tank 293 to pulsating gas inlet 292. Flow control valve 311, solenoid 297 and flow meter 298 are electrically connected to programmable controller 294. Furthermore, a bypass piping circuit 299 connects a flow control valve 301 to constant gas inlet 291.

Constant gas inlet 291 is coupled to collection tank 226 and provides a constant flow of the gas therein which enters a mesh covered opening 302 generally surrounding a periphery of tube 206 or adjacent to and between where a bottom end of the tube is coupled to a funnel shaped outlet 303 inside collection tank 226. This is the nitrogen that upwardly counter-flows through fuel pellets 202.

Pulsating inlet 292 is coupled to outlet 303 of reactor tube 206 and cyclically flows pulses of the nitrogen at an offset angle to intersect pellets 202 (preferably approximately perpendicular to the downward flow direction of the pellets). This pulsating gas flow causes an automatically adjustable back pressure to change a downward flow speed of the pellets in the reactor tube while also acting to selectively change the exiting flow direction and quantity of the pellets as they fall from or are moved along a conduit 305 onto a surface sitting upon a load cell 307. Load cell 307 measures or senses a weight or quantity of finished fuel pellets 202 thereon, and sends a sensed signals to programmable controller 294. A pressure gauge 309 measures or senses internal gas pressure inside collection tank 226, which is sealed, and also sends sensed signals to programmable controller 294. The gas entering pulsating inlet 292 is less than about 5% of the total flow of gas through both inlets 291 and 292. An amount of fuel pellets pushed out of conduit 305 is proportional to a gas flow rate controlled by flow control valve 296. Solenoid 297 is pulsating at a constant frequency and flow control valve 311 is desired to maintain consistency in an amount of air sent due to pressure variations due to cyclical valve 296 gas flow changes otherwise created due to non-uniform sizing of the pressurized pellets.

The pulsating gas valve system beneficially avoids wear and complexity of mechanical valves. Thus, it provides a non-contact flow control, for speed and quantity, of the downwardly moving fuel pellets through all of the zones. The present pulsating gas valve system 290 can be alternately used with any of the reactor embodiments disclosed herein and can even be used to control the flow of other workpiece particles, such as sand, coal dust, cement powder, polymeric pellets, and the like, that are gravity fed in any process; however, the present advantages of its use with fuel pellets may not be fully realized with these alternate uses.

A quantity of fuel particles exiting valve system 290 is proportional to a flow rate of gas passing solenoid valve 296 at each pulse. This is controlled using the flow control valve 311 according to a control algorithm and associated programmed software instructions 321, stored in nontransient RAM or ROM of programmable controller 294. The values A, B, C and D of FIGS. 11 and 12 are system dependent parameters (which can be manually set and/or automatically changed based on real-time sensed signals) for maintaining the desired mass flow of the solid fuel pellets using the pulsating L-valve 296, such as those for use with 2-5 mm diameter fuel pellets according to the following Table 1.

TABLE 1

Parameters for pulsating L-Valve

| Parameter | Unit | Minimum | Maximum | Currently in use |
|---|---|---|---|---|
| Solenoid pulsating frequency | Hz | 1 | 9 | 3 |
| A | SLPM | 2.5 | 8 | 3.5 |
| B | SLPM/g | 0.01 | 0.75 | 0.2 |
| C | SLPM/g | 0 | 1 | 0.5 |
| D | SLPM | 0 | 2.5 | 1 |
| L1 | mm | 18 | 42 | 32.9 |
| L2 | mm | 12 | 21 | 15.9 |
| L3 | mm | 10 | 30 | 19 |
| Nozzle ID | mm | 3 | 10 | 6 |

Figure 13:
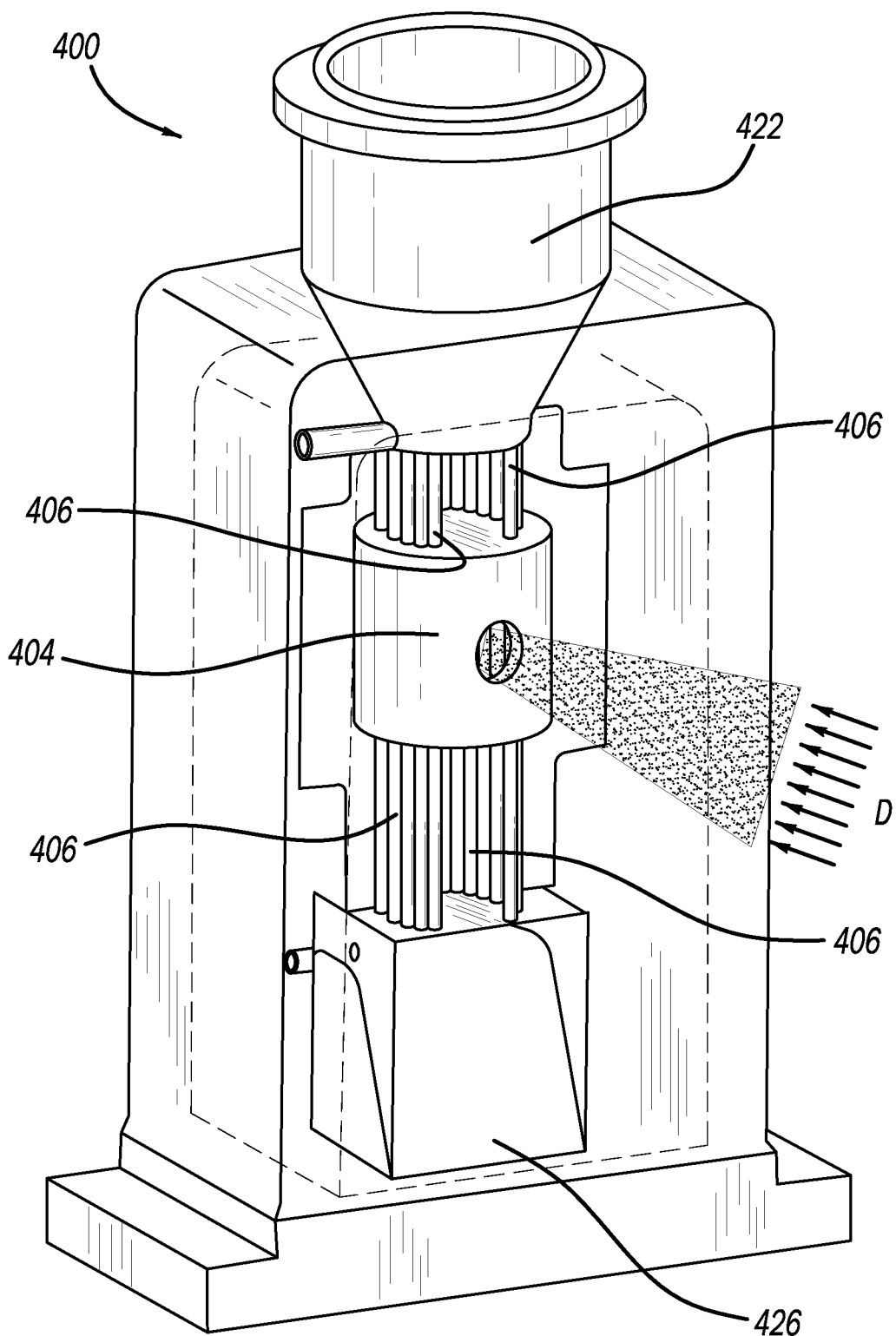
FIG. 13 is a diagrammatic view showing a third embodiment reduction reactor.

Another embodiment of CSP reactor 400 is a commercially scaled and high volume configuration as can be observed in FIG. 13. This exemplary plant provides a semicircular array of multiple reactor tubes 406 spanning through the recuperation, reduction, quenching and oxidation zones. The reactor shown here includes an intermediate solar furnace 404 in the reduction zone. There are preferably at least five, and more preferably at least 10, parallel and vertically elongated tubes 406 extending between upper hopper 422 and lower collection area 426. Moreover, a minimum diameter for each tube is preferably 50 mm, although in a high volume arrangement the tube diameter will likely be greater. A similar array of multiple tubes is envisioned for the oxidation reactor, but the tube diameters should be as large as possible so that the apparatus has a low surface to volume ratio for hydrogen and steam splitting; this will minimize heat loss to surroundings and minimize the amount of insulation needed.

Figure 19:
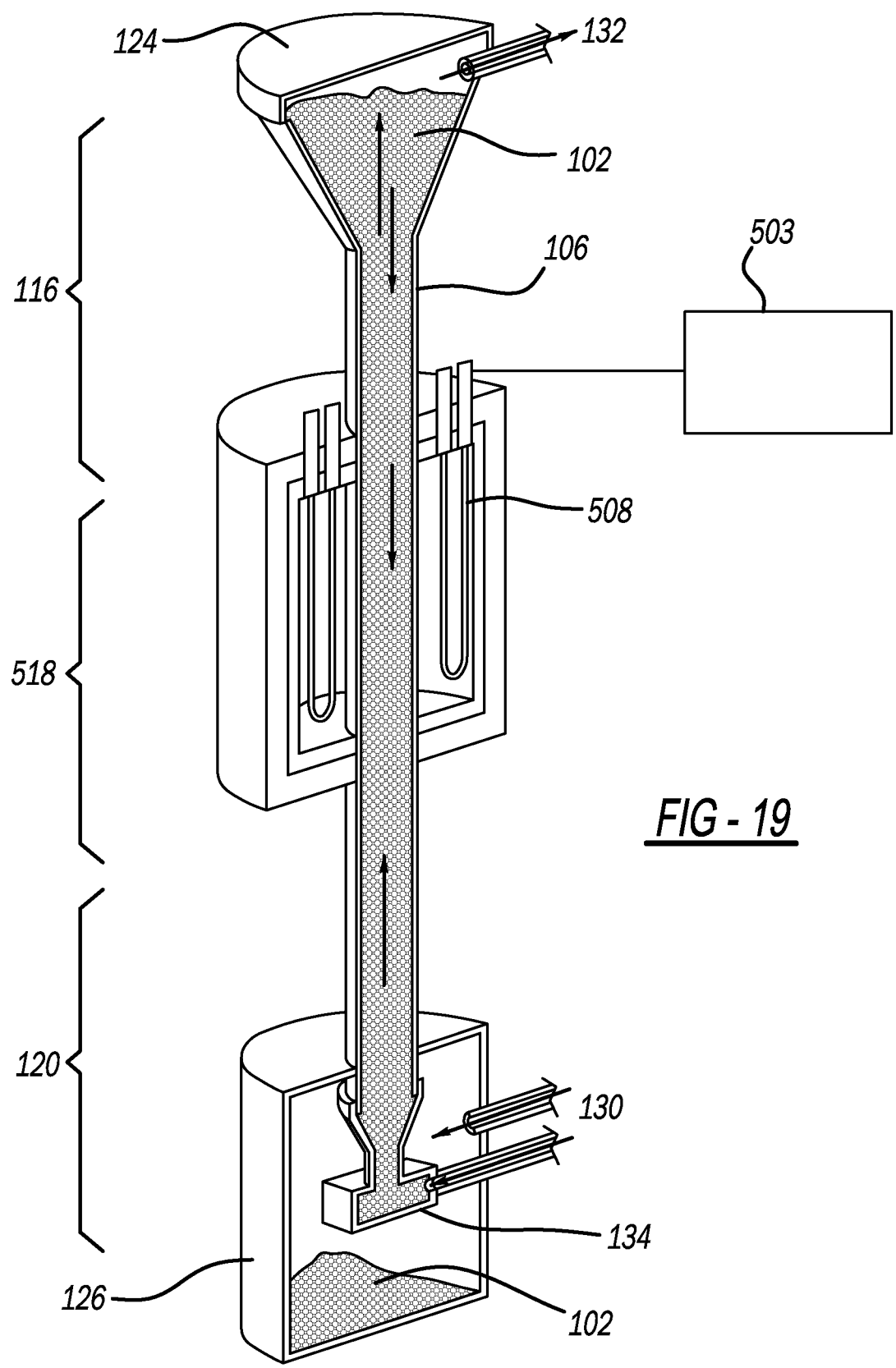
FIG. 19 is a diagrammatic view showing a fourth embodiment plant including the reduction reactor and/or an oxidation reactor configured to use excess electrical energy generated by a renewable power generator.

Referring to FIG. 19, a fourth embodiment plant apparatus includes a reduction reactor and/or an oxidation reactor configured to use excess electrical energy generated by a renewable power generator 503, such as wind turbines, water turbines, photovoltaic solar panels, geothermal or the like, to charge and/or discharge solid-state thermochemical fuel. The reactor of this exemplary embodiment is similar to the first embodiment in recuperation zone 116 and quenching zone 120, such that an elongated and hollow ceramic tube 106 substantially vertically extends from an upper hopper 124 to the furnace cavity receiver in a middle reduction zone 518. An outlet pipe 132 allows oxygen enriched air to flow therefrom. Spent sofuel 102 downwardly flows down tube 106 from hopper 124, through the furnace and to a lower collection tank 126. The sofuel flow is controlled by a controller 134 with oxygen depleted air inwardly flowing through pipes 130. Charged sofuel 102 is piled into tank 126 and thereafter externally fed to a storage unit or a oxidation reactor.

The difference with this embodiment is that heating elements 508 are located in the furnace of reduction zone 518. One or multiple heating elements 508 are elongated and may be coiled or looped within the furnace, which is otherwise entirely enclosed and sealed (except for the tube 106 and heating element 508 access) without a solar aperture. Heating elements 508 should withstand temperatures in excess of 1,500° C. and are preferably made from MoSi2, SiC or similar materials. For example, the heating elements may be inductive wires, resistive coiled conductors or the like. Alternately, heating elements can be infrared emitters within the furnace.

Excess electricity is fed to the heating elements from the renewable power generator instead of using solar energy. This is beneficial in causing the thermal field to be more uniform throughout the furnace which improves efficiencies and reduces residence time of the sofuel therein. This embodiment also reduce ambient heat losses. Furthermore, the renewable electricity heating enables the furnace to potentially run in a steady-state mode without the need to manage solar energy variability. The present ability store wind energy as a solid-state fuel is highly advantageous as well.

While various embodiments have been disclosed herein, it should be appreciated that other variations may exist. Any and all of the previously disclosed features may be mixed and matched with any or all of the other embodiments. Moreover, all of the following claims can be multiply dependent on each other in any combination. The above description is merely exemplary in nature and, thus, variations that do not depart from the gist of the invention are intended to fall within the spirit and scope of the present invention.

The invention claimed is:

1. A method of using energy, the method comprising:
 (a) downwardly feeding particles from a hopper to an upper heat-exchange area of a reactor, the particles being at least one of: magnesium manganese oxide, magnesium iron oxide, or magnesioferrite;
 (b) downwardly feeding the particles from the upper heat-exchange area to a furnace;
 (c) downwardly feeding the particles from the furnace to a lower heat-exchange area;
 (d) flowing gas into the lower heat-exchange area, the gas being oxygen-depleted when in the lower heat-exchange area;
 (e) upwardly flowing the gas from the lower heat-exchange area to the furnace;
 (f) upwardly flowing the gas from the furnace to the upper heat-exchange area;
 (g) pre-heating the particles with the gas as the gas flows through the particles in the upper heat-exchange area;
 (h) transferring oxygen from the particles to the gas as the gas flows through the particles in the furnace; and
 (i) cooling the particles with the gas as the gas flows through the particles in the lower heat-exchanging area.

2. The method of claim 1, further comprising converting the particles into oxygen-depleted fuel when the particles and gas are heated in the furnace which is a solar furnace, as they continuously move through at least one substantially vertically elongated and ceramic feeding tube located within the solar furnace, and the particles and the gas having counter-flowing directions.

3. The method of claim 2, further comprising:
 (a) moving the oxygen-depleted fuel from an entrance to a recuperation area;
 (b) moving the oxygen-depleted fuel from the recuperation area to an oxidation area, whereat the oxygen-depleted fuel receives oxygen and is converted back to the particles including a pre-reduced amount of the oxygen;
 (c) moving the particles from the oxidation area to a quenching area;
 (d) moving the particles from the quenching area to an exit;
 (e) flowing a second gas or steam into the quenching area;
 (f) flowing the second gas or the steam from the quenching area to the oxidation area during the moving of the particles from the oxidation area to the quenching area;
 (g) flowing the second gas or the steam from the oxidation area to the recuperation area during the moving of the oxygen-depleted fuel from the recuperation area to the oxidation area; and
 (h) pre-heating the oxygen-depleted fuel with the second gas or the steam, when the oxygen-depleted fuel and the second gas or the steam are in the recuperation area.

4. The method of claim 3, further comprising splitting the steam within at least one of the oxidation area and the recuperation area to produce substantially pure hydrogen.

5. The method of claim 1, further comprising exhausting oxygen-enriched gas from the upper heat-exchange area at substantially room temperature.

6. The method of claim 5, further comprising receiving the particles from the lower heat-exchange area at substantially room temperature.

7. The method of claim 1, further comprising storing the particles, which are oxygen-depleted, at substantially room temperature for more than two months without a loss of its energy content, and reusing the particles multiple times after the energy is removed therefrom as the oxygen-depleted particles are moved through subsequent generators.

8. The method of claim 1, further comprising:
 (a) supplying a substantially constant flow of the gas to a constant gas inlet coupled to the lower heat-exchange area;
 (b) supplying a pulsating flow of the gas to an entryway a bottom of the lower heat-exchange area and the constant gas inlet; and
 (c) the pulsating flow of the gas acting as a non-mechanical valve to control the flow of the particles downwardly moving through at least one of the zones.

9. The method of claim 1, wherein the energy is concentrated solar energy entering the furnace.

10. The method of claim 1, further comprising sending electricity from a renewable power generator to a heating element inside the furnace.

11. A method of using energy, the method comprising:
 (a) downwardly feeding particles from a hopper to an upper heat-exchange area of a reactor, the particles comprising at least one of: magnesium manganese oxide, magnesium iron oxide, or magnesioferrite;
 (b) downwardly feeding the particles from the upper heat-exchange area to a solar furnace;
 (c) downwardly feeding the particles from the solar furnace to a lower heat-exchange area;
 (d) flowing gas into the lower heat-exchange area, the gas being oxygen-depleted when in the lower heat-exchange area;
 (e) upwardly flowing the gas from the lower heat-exchange area to the solar furnace;
 (f) upwardly flowing the gas from the solar furnace to the upper heat-exchange area;

(g) pre-heating the particles with the gas as the gas flows through the particles in the upper heat-exchange area;

(h) transferring oxygen from the particles to the gas as the gas flows through the particles in the solar furnace; and (i) cooling the particles with the gas as the gas flows through the particles in the lower heat-exchanging area;

(j) exhausting oxygen-enriched gas from the upper heat-exchange area at substantially room temperature;

(k) receiving the particles from the lower heat-exchange area at substantially room temperature; and (l) converting the particles into oxygen-depleted fuel when the particles and the gas are heated in the solar furnace.

12. The method of claim 11, further comprising moving the particles and the gas in counter-flowing directions.

13. The method of claim 11, further comprising:

moving the oxygen-depleted fuel from an entrance to a recuperation area;

moving the oxygen-depleted fuel from the recuperation area to an oxidation area, whereat the oxygen-depleted fuel receives oxygen and is converted back to the particles including a pre-reduced amount of the oxygen;

moving the particles from the oxidation area to a quenching area;

moving the particles from the quenching area to an exit;

flowing a second gas or steam into the quenching area;

flowing the second gas or the steam from the quenching area to the oxidation area during the moving of the particles from the oxidation area to the quenching area;

flowing the second gas or the steam from the oxidation area to the recuperation area during the moving of the oxygen-depleted fuel from the recuperation area to the oxidation area; and pre-heating the oxygen-depleted fuel with the second gas or the steam, when the oxygen-depleted fuel and the second gas or the steam are in the recuperation area.

14. The method of claim 11, further comprising splitting steam within at least one of an oxidation area and a recuperation area to produce substantially pure hydrogen.

15. The method of claim 11, further comprising storing the oxygen-depleted fuel at substantially room temperature for more than two months without a loss of its energy content, and reusing the particles multiple times after the energy is removed therefrom as the oxygen-depleted fuel is moved through subsequent generators.

16. The method of claim 11, further comprising:

supplying a pulsating flow of the gas to an entryway a bottom of the lower heat-exchange area and the constant gas inlet; and the pulsating flow of the gas acting as a non-mechanical valve to control the flow of the particles downwardly moving through at least one of the zones.

17. The method of claim 11, further comprising sending electricity from a renewable power generator to a heating element inside the solar furnace.

* * * * *